(12) United States Patent  (10) Patent No.: US 8,035,713 B2
Oike et al.  (45) Date of Patent: Oct. 11, 2011

(54) DRIVING CIRCUIT, DRIVING METHOD, SOLID IMAGING DEVICE, AND ELECTRONIC APPARATUS

(75) Inventors: Yusuke Oike, Kanagawa (JP); Tadayuki Taura, Kanagawa (JP)

(73) Assignee: Sony Corporation, Tokyo (JP)

( * ) Notice: Subject to any disclaimer, the term of this patent is extended or adjusted under 35 U.S.C. 154(b) by 431 days.

(21) Appl. No.: 12/372,864

(22) Filed: Feb. 18, 2009

(65) Prior Publication Data

US 2009/0225206 A1  Sep. 10, 2009

(30) Foreign Application Priority Data

Mar. 7, 2008  (JP) ................................. 2008-057745

(51) Int. Cl.
*H04N 5/335* (2011.01)
*H03L 5/00* (2006.01)

(52) U.S. Cl. .......................... 348/300; 348/302; 327/333

(58) Field of Classification Search .................. 348/241, 348/294, 300, 302, 304, 307–310, E5.091; 250/208.1; 327/333
See application file for complete search history.

(56) References Cited

U.S. PATENT DOCUMENTS

| 6,674,471 B1 * | 1/2004 | Masuyama | 348/312 |
| 2005/0127977 A1 * | 6/2005 | Itoh | 327/333 |
| 2006/0066348 A1 * | 3/2006 | Miyagi | 326/81 |

FOREIGN PATENT DOCUMENTS

JP 10-294662 11/1998

* cited by examiner

*Primary Examiner* — Huy K Mai
(74) *Attorney, Agent, or Firm* — SNR Denton US LLP

(57) ABSTRACT

When a middle voltage within a withstanding voltage of a transistor from a first voltage VL as a low voltage of a source voltage and a second voltage VH as a high voltage of the source voltage is represented by VM and a third voltage within the withstanding voltage of a transistor from the second voltage VH or the first voltage VL is represented by VS or VD, a driving circuit includes: a first transistor whose source electrode is connected to a node of the middle voltage VM; a second transistor whose source electrode is connected to the drain electrode of the first transistor and whose drain electrode is connected to an output terminal; and a controller applying a signal having an amplitude of a difference between the voltages VL and VH to the gate electrode of the first transistor and applying a signal having an amplitude of a difference between the voltages VS and VH or between the voltages VL and VD to the gate electrode of the second transistor.

8 Claims, 19 Drawing Sheets

FIG. 7A
ON OPERATION (INITIAL PERIOD WHEN MIDDLE VOLTAGE IS TRANSFERRED)

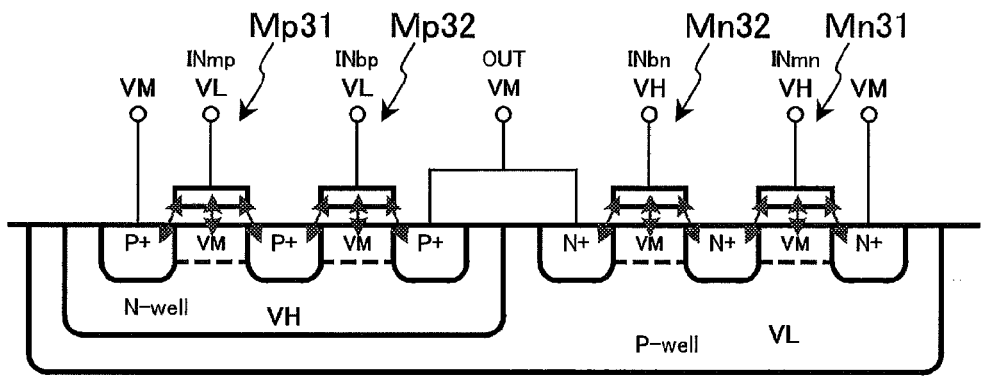

FIG. 7B
OFF OPERATION

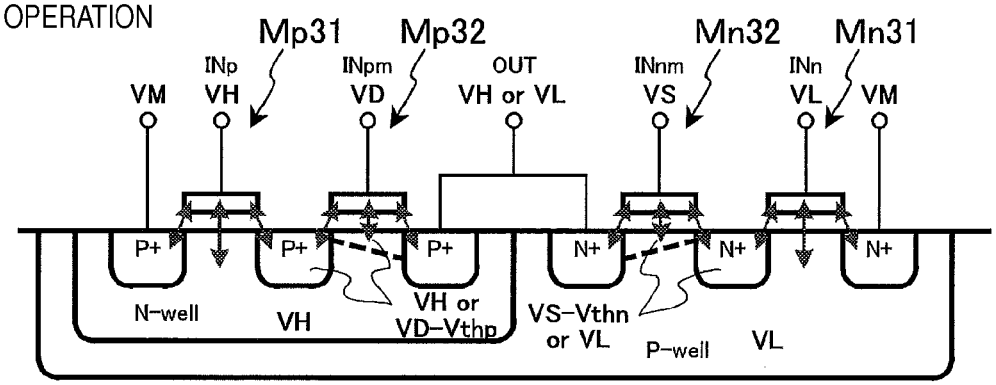

VOLTAGES APPLIED ALONG ARROWS SHOWN IN Fig. 7B,
SEQUENTIALLY FROM LEFT

| WHEN HIGH VOLTAGE VH IS APPLIED TO OUTPUT TERMINAL | WHEN LOW VOLTAGE VL IS APPLIED TO OUTPUT TERMINAL | |
|---|---|---|
| VH − VM | VH − VM | ⎫ |
| VH − VH | VH − VH | |
| VH − VH | VH − (VD − Vthp) | |
| VD − VH | VD − (VD − Vthp) | PMOS |
| VD − VH | VD − VL | |
| VD − VH | VD − VL | ⎭ |
| VS − VH | VS − VL | ⎫ |
| VS − VH | VS − VL | |
| VS − (VS − Vthn) | VS − VL | |
| VL − (VS − Vthn) | VL − VL | NMOS |
| VL − VL | VL − VL | |
| VL − VM | VL − VM | ⎭ |

"IN-VH"

"IN-VL"

"IN-VH"

"IN-VL"

DRIVING CIRCUIT, DRIVING METHOD, SOLID IMAGING DEVICE, AND ELECTRONIC APPARATUS

CROSS REFERENCES TO RELATED APPLICATIONS

The present invention contains subject matter related to Japanese Patent Application JP 2008-057745 filed in the Japanese Patent Office on Mar. 7, 2008, the entire contents of which is incorporated herein by reference.

BACKGROUND OF THE INVENTION

1. Technical Field

The present invention relates to a driving circuit, a driving method, a solid-state imaging device, and an electronic apparatus.

2. Related Art

In a driving circuit such as an output buffer circuit formed of CMOS, when a voltage amplitude greater than a withstanding voltage $\Delta Vlim$ of a transistor is necessary, a voltage greater than the withstanding voltage is applied to a gate oxide film of the transistor and thus the gate oxide film is broken down, thereby reducing the reliability.

For example, as shown in FIG. 18, in an output buffer circuit having a PMOS transistor Mp101 and an NMOS transistor Mn101 connected in series between a node of a low voltage (such as a ground voltage) VL and a node of a high voltage VH, it is considered that a drive for output is made with a voltage amplitude VL→VH (VH−VL>$\Delta Vlim$) greater than the withstanding voltage $\Delta Vlim$. For the purpose of simplicity, inversion logics are used in the output buffer circuit according to Related Example 1 shown in FIG. 18. Input and output waveforms are shown in FIG. 19 and device sections at IN=VH and IN=VL are shown in FIGS. 20A and 20B, respectively.

When a drive for an output OUT is made with the low voltage VL, the high voltage VH is applied to the gate electrode of the NMOS transistor Mn101 and the low voltage VL is applied to the drain, the source, and the channel of the transistor Mn101. Accordingly, a voltage VH−VL greater than the withstanding voltage $\Delta Vlim$ is applied to the gate oxide film, thereby causing a breakdown of the gate oxide film. Since a voltage greater than the withstanding voltage $\Delta Vlim$ is applied across the gate and drain electrodes of the PMOS transistor Mp101, the breakdown of the gate oxide film thereof is caused.

Similarly, when a drive for the output OUT is made with the high voltage VH, a voltage greater than the withstanding voltage is applied to the gate oxide film of the PMOS transistor Mp101 or across the gate and drain electrodes of the NMOS transistor Mn101, thereby causing the breakdown of the gate oxide film.

In the circuit configuration of the output buffer circuit according to Related Example 1, a high-voltage process such as a MOS device having a thick gate oxide film need be applied to at least the transistors Mp101 and Mn101 of the output terminal. However, the high-voltage process generally causes a problem with an increase in manufacturing cost or an increase in mounting area.

On the other hand, as shown in FIG. 21, an output buffer circuit is known which can make a drive with a voltage amplitude VL→VH greater than the withstanding voltage without using the high-voltage process by connecting a PMOS transistor Mp102 and an NMOS transistor Mn102 having bias voltages VS and VD applied to the gate electrodes thereof in series between the driving transistors Mp101 and Mn101 on the output terminal side of the output buffer circuit (for example, see JP-A-H10-294662). The input and output waveforms of the output buffer circuit according to Related Example 2 are shown in FIG. 22 and device sections at IN=VH and IN=VL are shown in FIGS. 23A and 23B, respectively.

Here, the bias voltage VD is a voltage within the withstanding voltage from the low voltage VL and the bias voltage VS is a voltage within the withstanding voltage from the high voltage VH. In addition, regarding the amplitude of the gate input of the driving transistors Mp101 and Mn101, a drive with VL→VD is made in the NMOS transistor Mn101 and a drive with VS→VH is made in the PMOS transistor Mp101, via the level shifters 101 and 102, respectively. Here, the bias transistors Mp102 and Mn102 to which the bias voltages VS and VD are applied have a function of preventing an output voltage from being directly applied to the drain electrodes of the driving transistors Mp101 and Mn101 at the time of turning off the driving transistors to allow the gate-drain voltage to be greater than the withstanding voltage.

When the input IN is at a high potential, the bias voltage VS is applied to the gate electrode of the PMOS driving transistor Mp101. Accordingly, the high voltage VH is output as the output voltage OUT. At this time, the potential of the drain electrode of the NMOS driving transistor Mn101 is VD−Vthn which is smaller by a voltage of about a threshold value Vthn than the bias voltage VD. Accordingly, VH−VD ($\leq \Delta Vlim$) is applied to the gate oxide film of the bias transistor Mn102 in maximum and (VD−Vthn)−VL ($\leq \Delta Vlim$) is applied to the gate oxide film of the PMOS driving transistor Mn101 in maximum, which are smaller than the withstanding voltage.

The same is true when the input IN is at the low potential. That is, since the bias voltage VD is applied to the gate electrode of the NMOS driving transistor Mn101, the low voltage VL is output as the output voltage OUT. At this time, the drain potential of the PMOS driving transistor Mp101 is VS−Vthp which is greater by a voltage of about the threshold voltage Vthp than the bias voltage VS. Accordingly, VS−VL ($\leq \Delta Vlim$) is applied to the gate oxide film of the bias transistor Mp102 in maximum and VH−(VS−Vthp) ($\leq \Delta Vlim$) is applied to the gate oxide film of the NMOS driving transistor Mn101 in maximum, which are smaller than the withstanding voltage.

SUMMARY OF THE INVENTION

However, like the related technique (Related Example 2) described in JP-A-H10-294662, in a configuration in which the bias transistors Mp102 and Mn102 to which the bias voltages VS and VD are applied are connected in series to the driving transistors Mp101 and Mn101, the drive cannot be made when the driving voltages and the middle voltage VM have a relation of (VD−Vthn)$\leq$VM$\leq$(VS−Vthp). Except for the above-mentioned range, when VM≈(VD−Vthn) or VM≈(VS−Vthp), supply current is small and thus sufficient driving ability cannot be obtained. This is described specifically now.

FIG. 24 shows a case where a drive with the middle voltage VM is made in the configuration shown in FIG. 21. In FIG. 24, the level shifters 103 and 104 have the same circuit configuration as shown in FIG. 21. Here, the circuit configuration is omitted. Input and output waveforms of the level shifters 103 and 104 are shown in FIGS. 25A and 25B.

The level shifter 103 can make a drive for the output OUT with VL→VH. When the drive is made with the middle voltage VM, internal signals INp and INn of the level shifter 103 are set to INp=VH and INn=VL and the output OUTa of the level shifter 103 is set to OFF (high impedance). On the other hand, the level shifter 104 employs the circuit shown in FIG. 21 so as to apply the middle voltage VM to the source electrode and to make a drive for the output OUTb from one or both of PMOS and NMOS with the middle voltage VM.

However, when the middle voltage VM satisfies a relation of (VD−Vthn)≦VM≦(VS−Vthp) together with the bias voltages VD and VS and the threshold values Vthp and Vthn, or when it satisfies VM≈(VD−Vthn) or VM≈(VS−Vthp) which is close to the boundaries, as shown in FIG. 26, the current supply to the output terminal is not sufficiently obtained from the PMOS and the NMOS, thereby not making the drive. When VM≈(VD−Vthn) or VM≈(VS−Vthp), the supply current is small, thereby not obtaining the satisfactory driving ability.

Therefore, there is a need for providing a driving circuit and a driving method that can make a drive with a middle voltage between a low voltage and a high voltage of a voltage source without using a high-voltage element structure for a gate oxide film of a transistor, a solid-state imaging device employing the driving circuit, and an electronic apparatus mounted with the solid-state imaging device.

According to an embodiment of the invention, there is provided a driving circuit including, when a middle voltage within a withstanding voltage of a transistor from a first voltage VL as a low voltage of a source voltage and a second voltage VH as a high voltage of the source voltage is represented by VM and a third voltage within the withstanding voltage of a transistor from the second voltage VH or the first voltage VL is represented by VS or VD: a first transistor whose source electrode is connected to a node of the middle voltage VM and a second transistor whose source electrode is connected to the drain electrode of the first transistor and whose drain electrode is connected to an output terminal. The first transistor close to the node is driven with a voltage in the range of the first voltage VL to the second voltage VH and the second transistor close to the output terminal is driven with a voltage in the range of the first voltage VL to the third voltage VD or a voltage in the range of the third voltage VD to the second voltage VH.

The driving circuit according to the embodiment of the invention is applied to a circuit portion outputting the middle voltage VM in a solid-state imaging device using the middle voltage VM to drive a unit pixel. The solid-state imaging device employing the driving circuit is mounted on electronic apparatuses such as imaging devices such as digital cameras or video cameras, portable terminals such as mobile phones having an imaging function, and copiers employing the solid-state imaging device as an image reading unit and is used as an image input unit (photoelectric conversion unit) inputting an image or reading an image.

In the driving circuit, the solid-state imaging device employing the driving circuit, and the electronic apparatus mounted with the solid-state imaging device, when the first transistor is driven with the voltage in the range of VL to VH which departs the withstanding voltage range and the second transistor is driven with the voltage in the withstanding voltage range, that is, the voltage in the range of VL to VD or in the range of VD to VH, the middle voltage VM to be transferred is applied to the source electrodes, the drain electrodes, and the channel regions of the first and second transistors. Since the first voltage or the second voltage is applied to the wells in which the first and second transistors are formed but the middle voltage VM is applied to the channel regions, the voltage greater than the withstanding voltage is not applied to the gate oxide films of the transistors.

According to the embodiment of the invention, since a voltage greater than the withstanding voltage is not applied to the gate oxide films of the transistors, it is possible to make a drive with the middle voltage VM without employing a high-voltage element structure for the gate oxide films of the transistors.

BRIEF DESCRIPTION OF THE DRAWINGS

FIGS. 7A and 7B are diagrams illustrating reasons for satisfying the withstanding voltage of a gate oxide film by driving the second output buffer circuit according to Example 1.

DESCRIPTION OF PREFERRED EMBODIMENTS

Hereinafter, embodiments of the invention will be described in detail with reference to the accompanying drawings.

Figure 1:
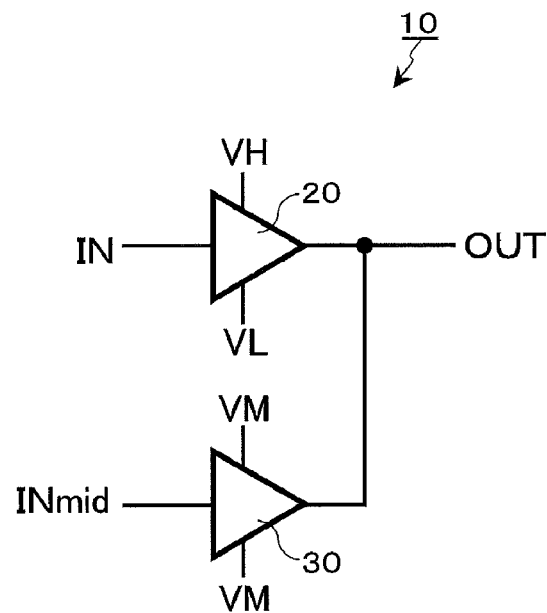
FIG. 1 is a block diagram illustrating a driving circuit according to an embodiment of the invention.

FIG. 1 is a block diagram illustrating a driving circuit according to an embodiment of the invention. The driving circuit 10 according to this embodiment includes a first output buffer circuit 20 and a second output buffer circuit 30.

Here, in an operating power source of the driving circuit 10 according to this embodiment, when a low voltage of the source voltage thereof is represented by a first voltage (hereinafter, referred to as "low voltage") VL and a high voltage thereof is represented by a second voltage (hereinafter, referred to as "high voltage") VH, the low voltage VL and the high voltage VH are set so that an amplitude of a difference between the voltages between VL and VH (VL–VH amplitude) is greater than a withstanding voltage ΔVlim of a transistor in the driving circuit 10 (VL–VH>ΔVlim).

First Output Buffer Circuit

Figure 2:
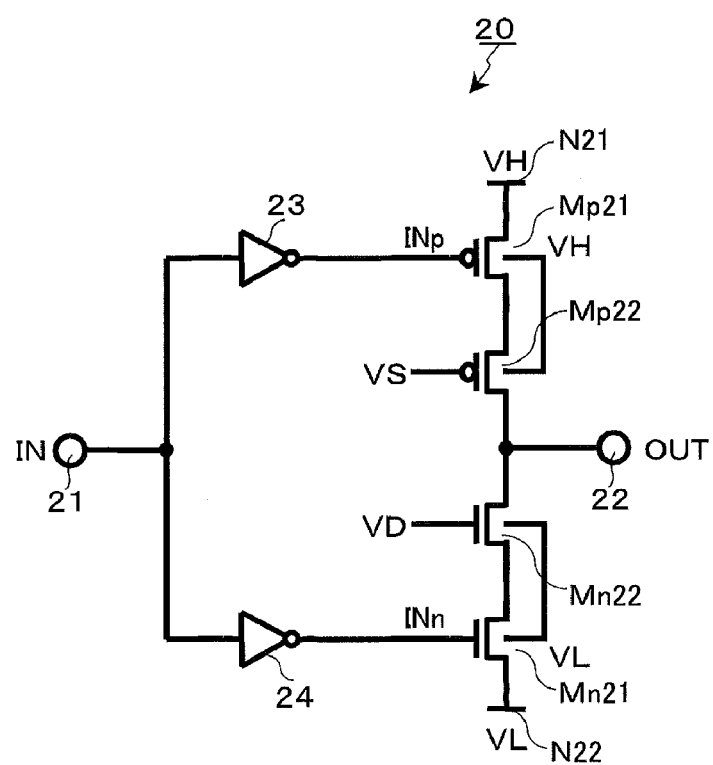
FIG. 2 is a circuit diagram illustrating a circuit configuration of a first output buffer circuit.
Figure 21:
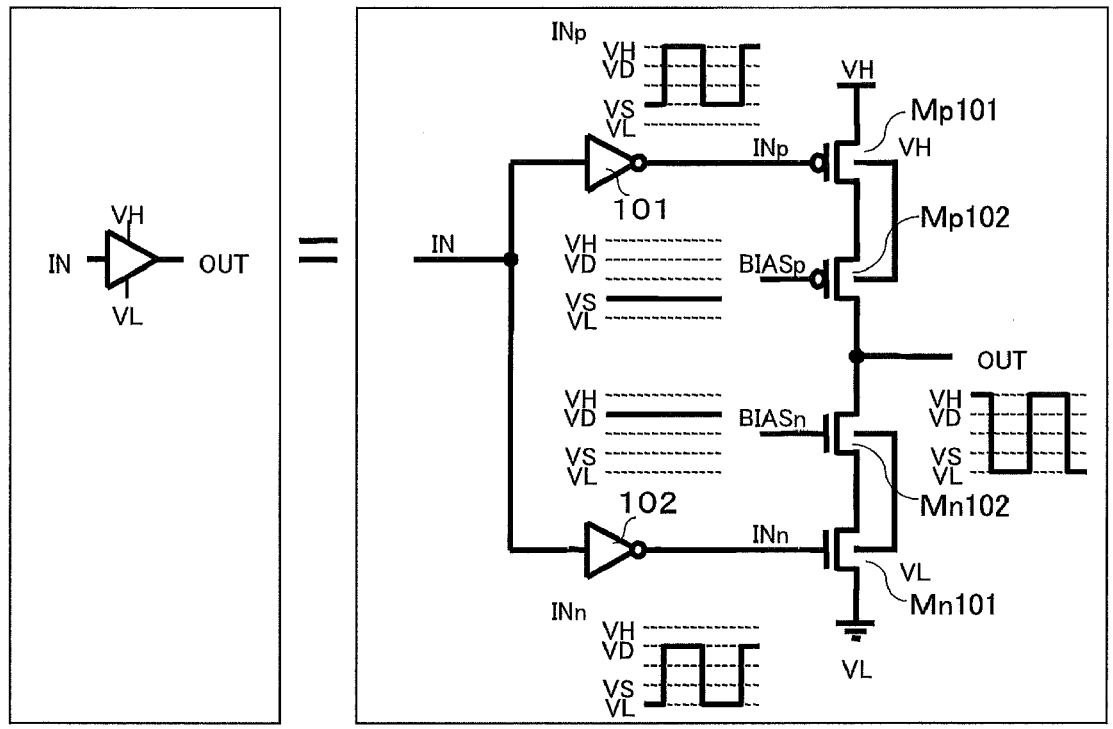
FIG. 21 is a block diagram illustrating a circuit configuration of an output buffer circuit according to Related Example 2.

First, a first output buffer circuit 20 is described now. The first output buffer circuit 20 basically has the same circuit configuration as Related Example 2 shown in FIG. 21, that is, a circuit configuration capable of driving a load connected to an output terminal 22 with the voltage amplitude of VL→VH greater than the withstanding voltage ΔVlim of a transistor without using the high-voltage process (first driving unit). FIG. 2 shows an example of the circuit configuration of the first output buffer circuit 20.

As shown in FIG. 2, the first output buffer circuit 20 includes a PMOS driving transistor Mp21 whose source electrode is connected to a node N21 of a high voltage VH, a PMOS bias transistor Mp22 connected between the drain electrode of the driving transistor Mp21 and an output terminal 22, an NMOS driving transistor Mn21 whose source electrode is connected to a node N22 of a low voltage VL, and an NMOS bias transistor Mn22 connected between the drain electrode of the driving transistor Mn21 and the output terminal 22.

An input pulse IN of a predetermined amplitude input through an input terminal 21 is shifted in level to a pulse signal having an amplitude of a difference between the voltages VS and VH (VS–VH amplitude) by a level shifter 23 and is then input to the gate electrode of the driving transistor Mp21. The input pulse is shifted in level to a pulse signal having an amplitude of a difference between the voltages VL and VD (VL–VD amplitude) by a level shifter 24 and is then input to the gate electrode of the driving transistor Mn21.

The gate electrode of the PMOS bias transistor Mp22 is supplied with a bias voltage VS and the gate electrode of the NMOS bias transistor Mn22 is supplied with a bias voltage VD. Here, the bias voltage VS is a voltage (VS−VL≦ΔVlim) within the withstanding voltage ΔVlim of a transistor from the low voltage VL and the bias voltage VD is a voltage (VH−VD≦ΔVlim) within the withstanding voltage of a transistor from the low voltage VH.

In this way, the bias transistors Mp22 and Mn22 whose gate electrodes are supplied with the bias voltages VS and VD, respectively, have a function of preventing an output voltage OUT from being directly applied to the drain electrodes of the driving transistors Mp21 and Mn21 at the time of turning off the driving transistors Mp21 and Mn21 to allow the gate-drain voltage to be greater than the withstanding voltage.

In the first output buffer circuit 20 having the above-mentioned configuration, when the input pulse IN is at a high potential, the gate electrode of the PMOS driving transistor Mp21 is supplied with the bias voltage VS and thus the high voltage VH is output as the output voltage OUT. At this time, the drain potential of the NMOS driving transistor Mn21 is VD−Vthn which is smaller by about the threshold value Vthn than the bias voltage VD. Accordingly, the gate oxide film of the bias transistor Mn22 is supplied with VH−VD (≦ΔVlim) in maximum and the gate oxide film of the PMOS driving transistor Mn21 is supplied with (VD−Vthn)−VL (≦ΔVlim) in maximum, which are smaller than the withstanding voltage.

The same is true when the input pulse IN is at a low potential. That is, since the gate electrode of the NMOS driving transistor Mn21 is supplied with the bias voltage VD, the low voltage VL is output as the output voltage OUT. At this time, the drain potential of the PMOS driving transistor Mp21 is VS−Vthp which is greater by about the threshold value Vthp than the bias voltage VS. Accordingly, the gate oxide film of the bias transistor Mp22 is supplied with VS−VL (≦ΔVlim) in maximum and the gate oxide film of the NMOS driving transistor Mn21 is supplied with VH−(VS−Vthp) (≦ΔVlim) in maximum, which are smaller than the withstanding voltage.

Figure 22:
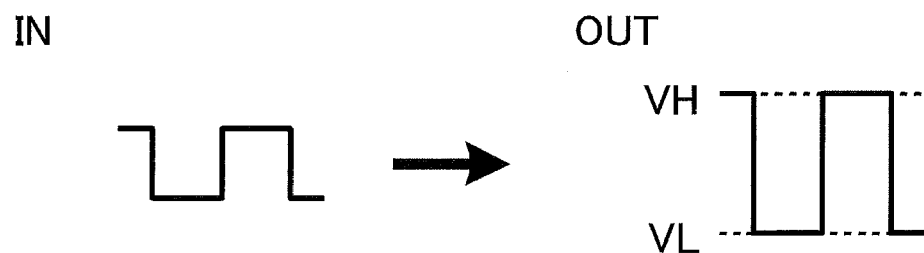
FIG. 22 is a diagram illustrating input and output waveforms of the output buffer circuit according to Related Example 2.
Figure 23A:
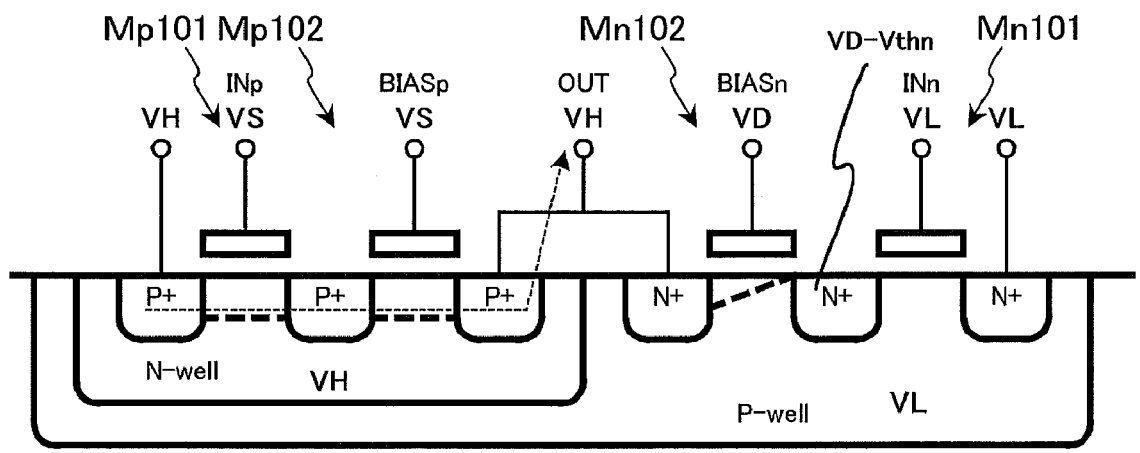
FIGS. 23A and 23B are sectional views illustrating a device section at the time of IN=VH and IN=VL, respectively, in the output buffer circuit according to Related Example 2.
Figure 23B:
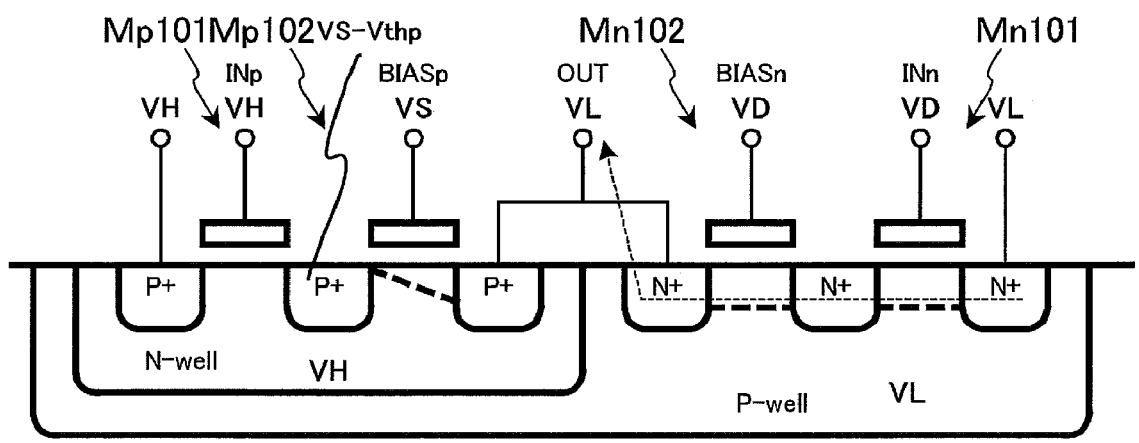
Figure 24:
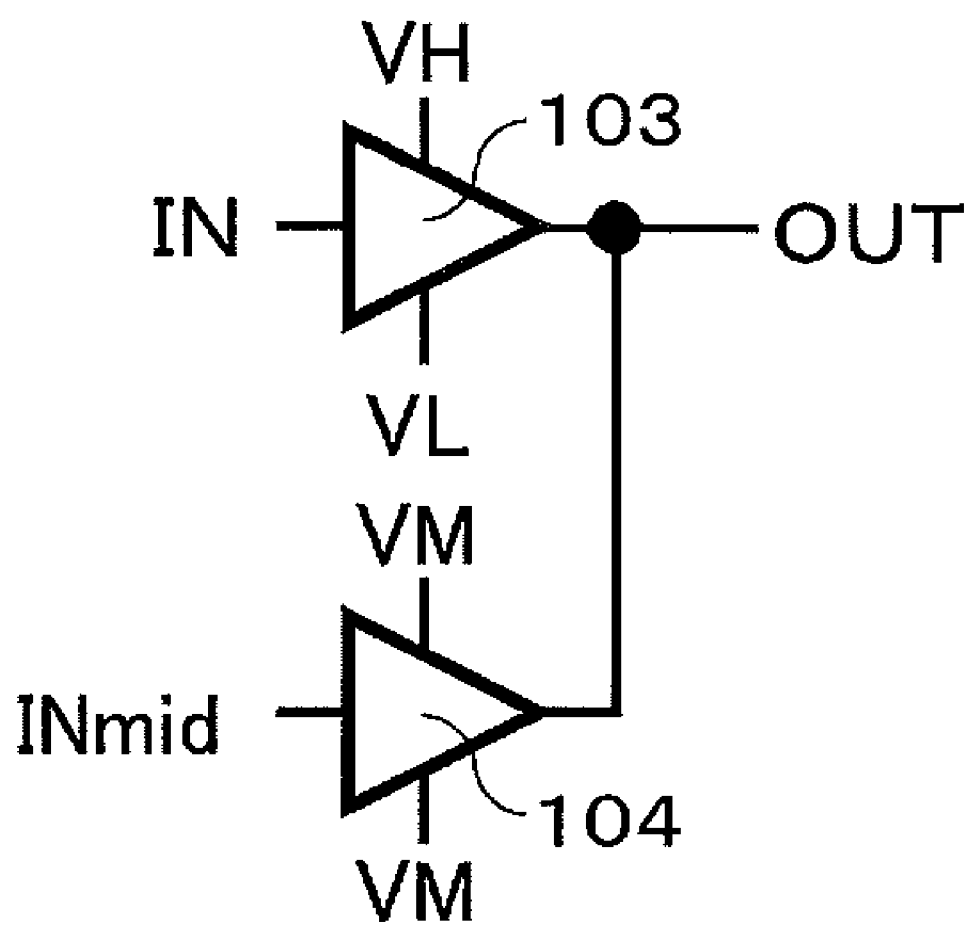
FIG. 24 is a block diagram illustrating a circuit configuration when a middle voltage drive is made with a middle voltage in the output buffer circuit according to Related Example 2.
Figure 25A:
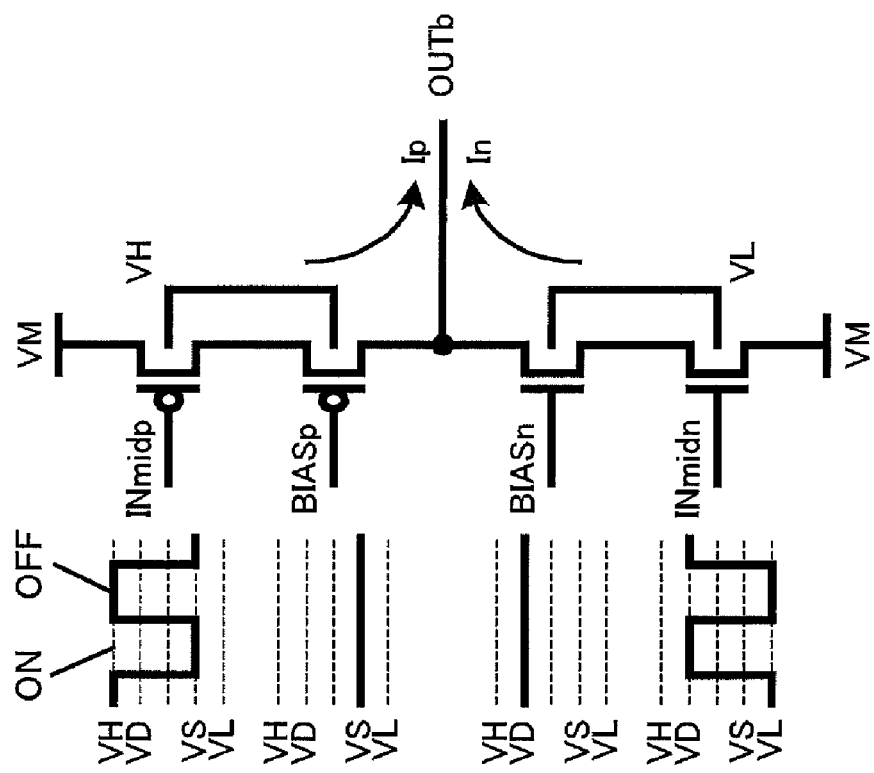
FIGS. 25A and 25B are diagrams illustrating input and output waveforms when a middle voltage drive is made in the output buffer circuit according to Related Example 2.
Figure 25B:
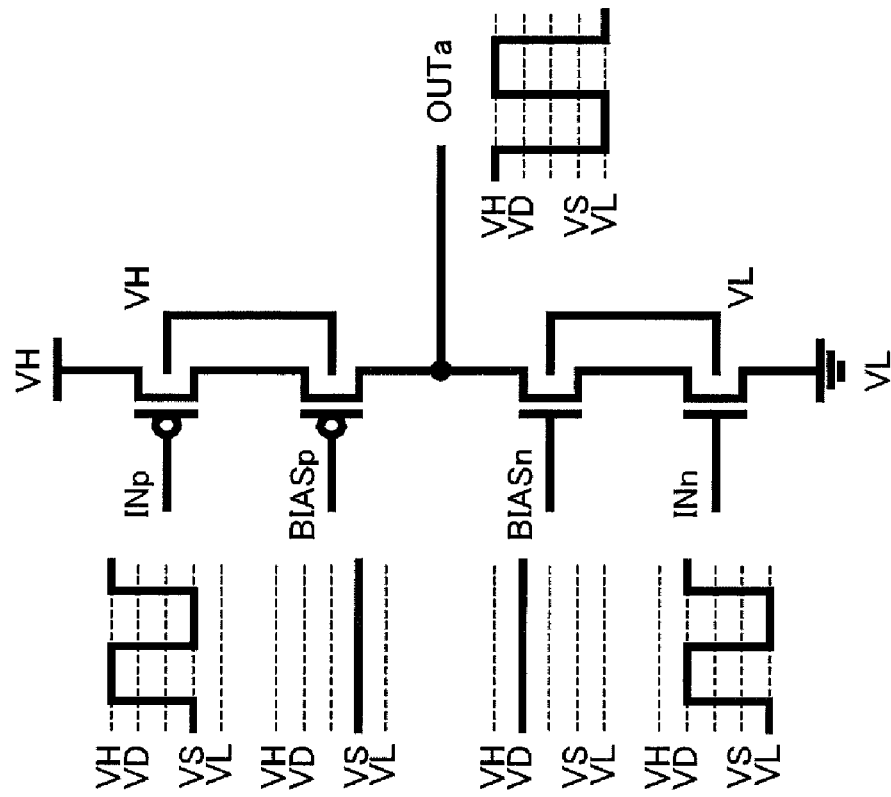
Figure 26:
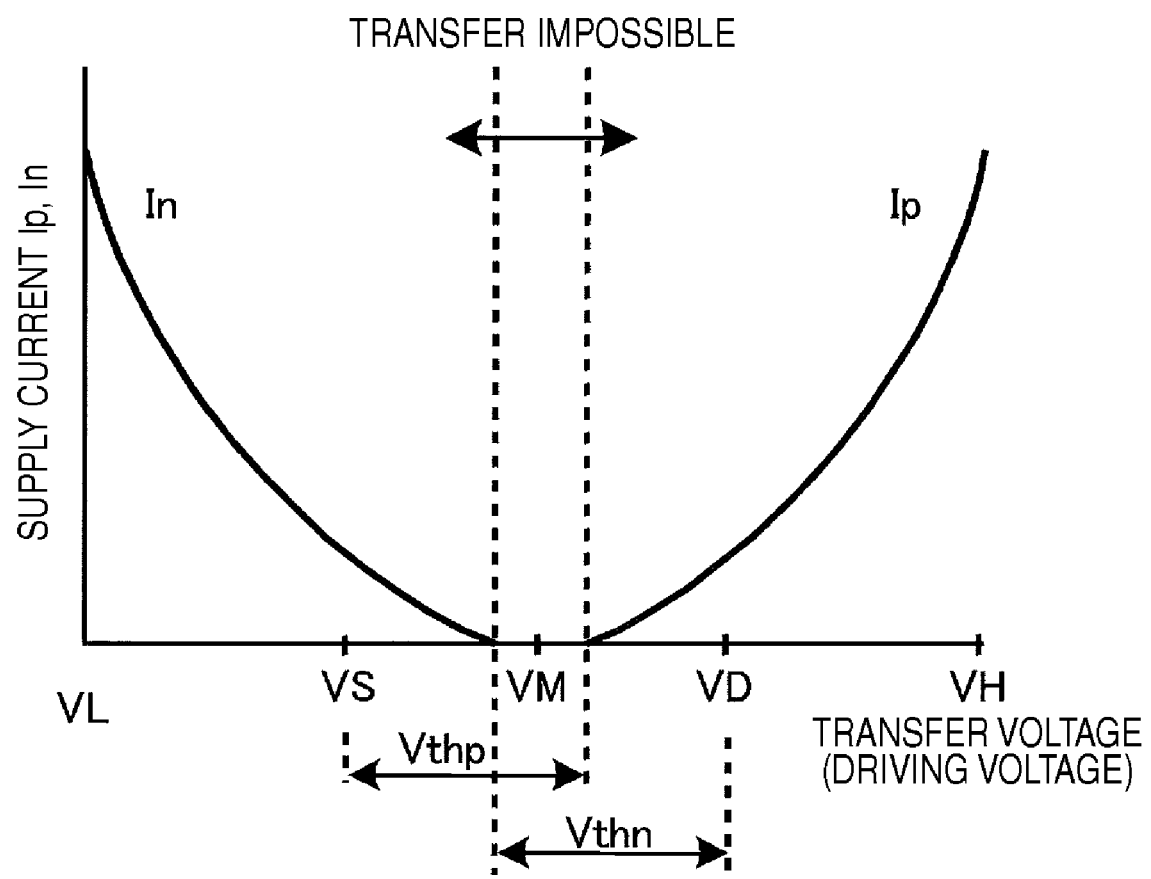
FIG. 26 is a diagram illustrating problems when the middle voltage drive is made in the output buffer circuit according to Related Example 2.

As can be seen from the above description, by the use of the first output buffer circuit 20 having such a configuration that the bias transistors Mp22 and Mn22 are connected between the driving transistors Mp21 and Mn21 and the output terminal 22, it is possible to perform the drive with the voltage amplitude VL→VH greater than the withstanding voltage ΔVlim of a transistor without using the high voltage process. The input and output waveforms of the first output buffer circuit 20 are the same as shown in FIG. 22.

Second Output Buffer Circuit

Figure 3:
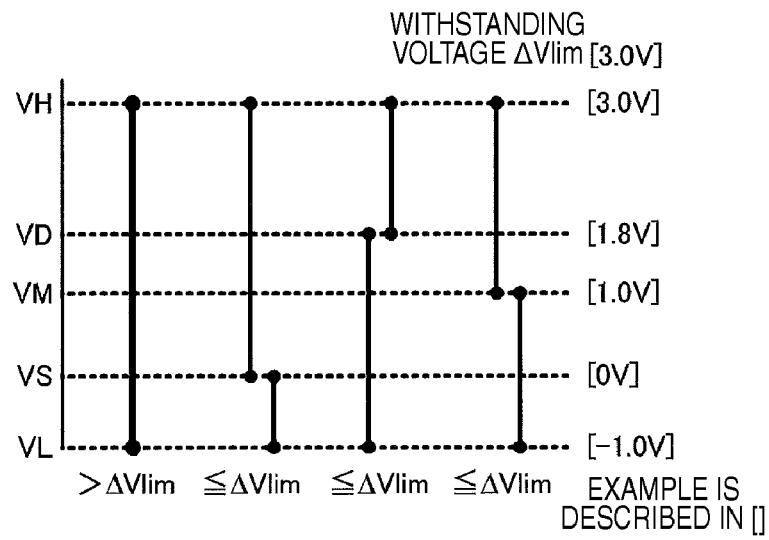
FIG. 3 is a diagram illustrating a magnitude relation of voltages used in a second output buffer circuit.

A second output buffer circuit 30 will be described now. Here, voltages used in the second output buffer circuit 30 are defined as follows. The magnitude relation of the voltages is shown in FIG. 3.

ΔVlim: withstanding voltage of transistor (for example, 3.0 V)

Vthn: threshold value of NMOS transistor (for example, 0.8 V)

Vthp: threshold value of PMOS transistor (for example, −1.0 V)

VH: high voltage greater than VL by withstanding voltage ΔVlim or more (for example, 3.0 V)

VL: low voltage smaller than VH by withstanding voltage ΔVlim (for example, −1.0 V)

VD: voltage (third voltage) within withstanding voltage from VL and VH (for example, 1.8 V)

($VD-VL \leq \Delta Vlim$ and $VH-VD \leq \Delta Vlim$, where $VD-VL > Vthn$)

VS: voltage (third voltage) within withstanding voltage from VL and VH (for example, 0 V)

($VS-VL \leq \Delta Vlim$ and $VH-VS \leq \Delta Vlim$, where $VS-VH > Vthp$)

VM: middle voltage within withstanding voltage from VH and VL (for example, 1.0 V)

($VM-VL \leq \Delta Vlim$ and $VH-VM \leq \Delta Vlim$)

The second output buffer circuit 30 has a circuit configuration (second driving unit) capable of driving a load (not shown) connected to the output terminal with the middle voltage VM (VH−ΔVlim≦VM≦VL+ΔVlim) between the low voltage VL and the high voltage VH. Examples of the specific circuit configuration of the second output buffer circuit 30 will be described now.

Example 1

Figure 4:
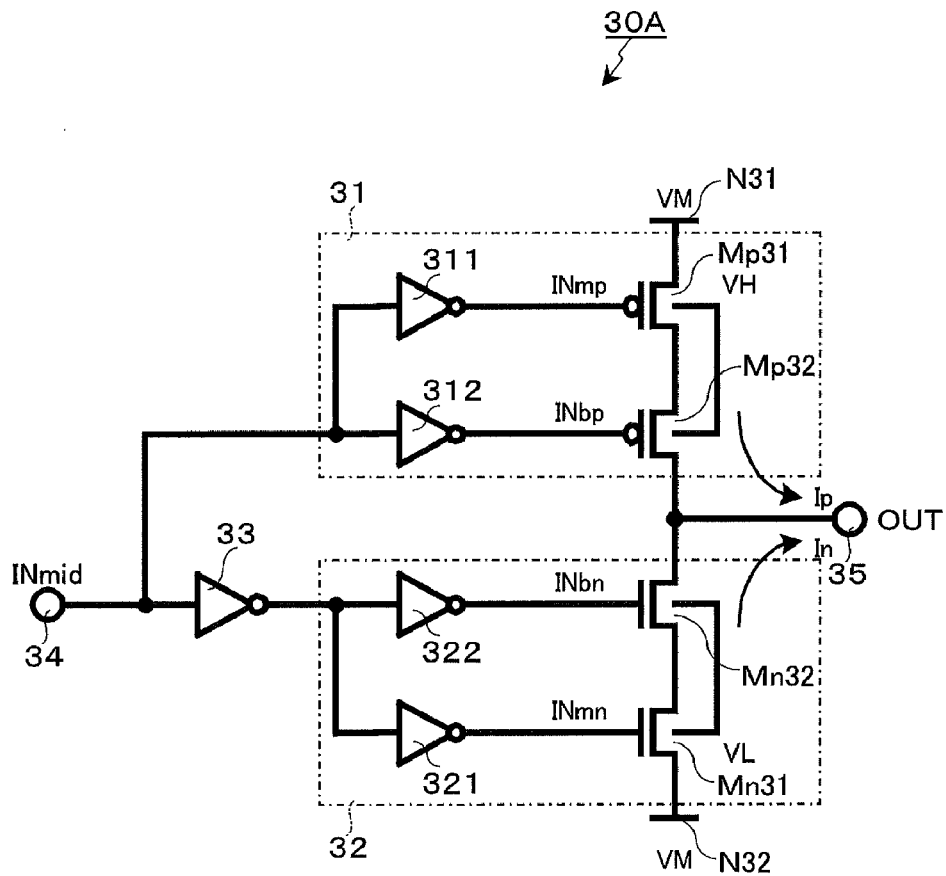
FIG. 4 is a circuit diagram illustrating a circuit configuration of a second putout buffer circuit according to Example 1.

FIG. 4 is a circuit diagram illustrating a circuit configuration of the second output buffer circuit 30A according to Example 1. As shown in FIG. 4, the second output buffer circuit 30A according to Example 1 includes a first buffer 31 including a PMOS transistor, a second buffer 32 including an NMOS transistor, and an inverter 33 supplying an input pulse INmid of a predetermined amplitude to the first buffer 31 from an input terminal 34 as an non-inverted input and inverting and supplying the input pulse INmid to the second buffer as an inverted input.

The first buffer 31 includes a PMOS transistor Mp31 whose source electrode is connected to a node N31 of the middle voltage VM, a PMOS transistor Mp32 whose source electrode is connected to the drain electrode of the PMOS transistor Mp31 and whose drain electrode is connected to an output terminal 35, and two level shifters 311 and 312. The output terminal 35 is the same as the output terminal 22 of the first output buffer circuit 20.

The level shifter 311 shifts the input pulse INmid to a pulse signal of a VL–VH amplitude in level and supplies the shifted input pulse to the gate electrode of the PMOS transistor Mp31. A circuit example of the level shifter 311 will be described later. The level shifter 312 shifts the input pulse INmid to a pulse signal of a VL–VD amplitude in level and supplies the shifted input pulse to the gate electrode of the PMOS transistor Mp32. For example, the level shifter 312 can be embodied by the first output buffer circuit 20 serving as a level shifter.

The second buffer 32 includes an NMOS transistor Mn31 whose source electrode is connected to a node N32 of the middle voltage VM, an NMOS transistor Mn32 whose source electrode is connected to the drain electrode of the NMOS transistor Mn31 and whose drain electrode is connected to an output terminal 35, and two level shifters 321 and 322.

The level shifter 321 shifts the input pulse INmid inverted in polarity by the inverter 33 to a pulse signal of a VL–VH amplitude in level and supplies the shifted input pulse to the gate electrode of the NMOS transistor Mn31. A circuit example of the level shifter 321 will be described later. The level shifter 322 shifts the input pulse INmid inverted in polarity by the inverter 33 to a pulse signal of a VS–VH amplitude in level and supplies the shifted input pulse to the gate electrode of the NMOS transistor Mn32. For example, the level shifter 322 can be embodied by the first output buffer circuit 20.

In the first buffer 31 and the second buffer 32, the level shifters 311 and 321 and the level shifters 312 and 322 form a controller in which the level shifters 311 and 321 apply a signal of a VL–VH amplitude to the gate electrodes of the transistors Mp31 and Mn31 close to the nodes N31 and N32 and the level shifters 312 and 322 apply signals of VS–VH and VL–VD amplitudes to the gate electrodes of the transistors Mp32 and Mn32 close to the output terminal 35.

The controller is not limited to including the level shifters 311 and 321 and the level shifters 312 and 322, but may have any configuration as long as it can apply the signal of the VL–VH amplitude to the gate electrodes of the transistors Mp31 and Mn31 close to the nodes N31 and N32 and apply the signal of VS–VH and VL–VD amplitudes to the gate electrodes of the transistors Mp32 and Mn32 close to the output terminal 35.

The first output buffer circuit 20 has a circuit configuration for applying the bias voltages VS and VD to the bias transistors Mp12 and Mn12 close to the output terminal 22 in a non-inverted manner. On the contrary, the second output buffer circuit 30A has a circuit configuration for driving the transistors Mp32 and Mn32 close to the output terminal 35 with the voltage smaller than the withstanding voltage, that is, the voltage in the range of VL to VD or in the range of VS to VH.

Specifically, in the second output buffer circuit 30A, the input pulse INmid of a predetermined amplitude is shifted in level to the pulse signal of the VL–VD amplitude and the pulse signal of the VS–VH amplitude by the level shifters 321 and 322 and is then applied to the gate electrodes of the transistors Mp32 and Mn32. In the transistors close to the bode N31 and N32, the PMOS transistor Mp31 is driven with VH→VL and the NMOS transistor Mn31 is driven with VL→VH.

That is, in the second output buffer circuit 30A, the following three points are important.

(1) The middle voltage VM (VH−ΔVlim≦VM≦VL+ΔVlim) is supplied (transmitted) to the output terminal 35 to drive the load with the middle voltage VM.

(2) The transistors Mp32 and Mn32 close to the output terminal 35 are driven with the voltages within the withstanding voltage range (VL to VD and VS to VH), not with the non-inverted supply of the bias voltages.

(3) The transistors Mp31 and Mn31 close to the nodes N31 and N32 are driven with the voltage in the range of VL to VH which depart from the withstanding voltage range, not with the voltage within the withstanding voltage range.

Figure 5:
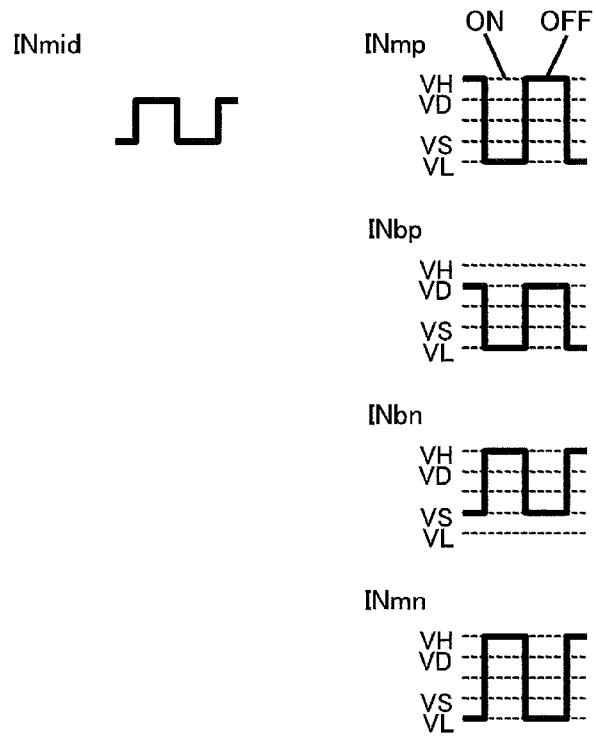
FIG. 5 is a diagram illustrating input and output waveforms of the second output buffer circuit according to Example 1.

By satisfying the points (1) to (3), the load connected to the output terminal 35 can be driven with the middle voltage VM without applying the voltage greater than the withstanding voltage to the gate oxide films of the transistors Mp31, Mp32, Mn31, and Mn32. FIG. 5 shows waveforms of the input pulse INmid and the pulses INmp, INbp, INbn, and INmn input to the gate electrodes of the transistors Mp31, Mp32, Mn31, and Mn32

Figure 6:
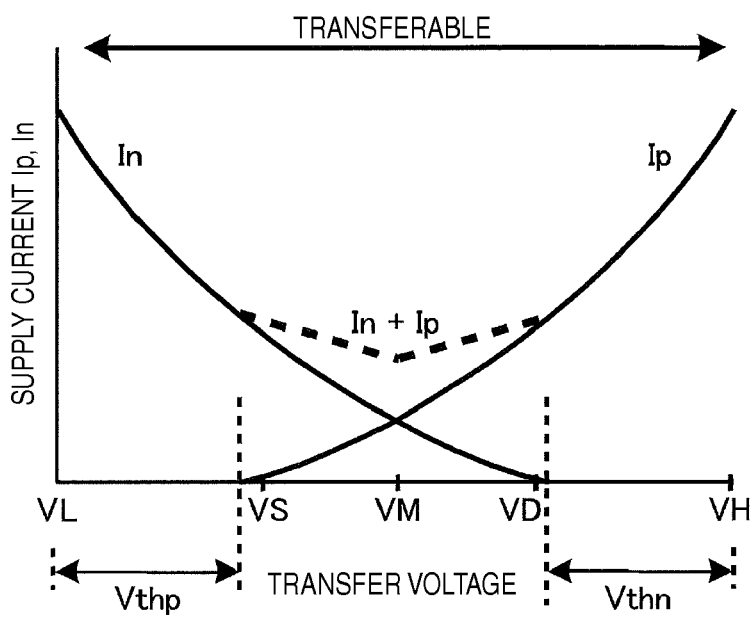
FIG. 6 is a diagram illustrating a relation between a transfer voltage and a supply current in the second output buffer circuit according to Example 1.

In the second output buffer circuit 30A according to Example 1, current Ip is supplied to the output terminal 35 from the first buffer 31, current In is supplied to the output terminal 35 from the second buffer 32, and the sum of the current Ip and In serves as the supply current to the output terminal 35 as indicated by the broken line in FIG. 6, thereby obtaining great driving power in a wide range.

The reasons for satisfying the withstanding voltage of the gate oxide film by making a drive using the second output buffer circuit 30A according to Example 1 will be described now with reference to FIGS. 7A and 7B.

FIG. 7A shows the supply voltages to the gate oxide films in an ON operation, that is, in supplying the middle voltage VM to the output terminal 35. The gate electrodes of the PMOS transistors Mp31 and Mp32 are supplied with the low voltage VL, but the source, drain, and channel of the transistors Mp31 and Mp32 are supplied with the middle voltage VM to be supplied. Particularly, since the high voltage VH is applied to the wells but the middle voltage VM is applied to the channel formed in the ON operation, the voltage VH−VL ($>\Delta$Vlim) greater than the withstanding voltage is not applied to the gate oxide film.

Similarly, since the gates of the NMOS transistors Mn31 and Mn32 are supplied with the high voltage VH but the sources, drains, and channels of the transistors Mn31 and Mn32 are supplied with the middle voltage VM, the application voltage to the gate oxide films is not greater than the withstanding voltage. This is because the middle voltage VM satisfies VH−$\Delta$Vlim$\leq$VM$\leq$VL+$\Delta$Vlim.

FIG. 7B shows the supply voltages to the gate oxide films in an OFF operation. In the OFF operation, the output terminal 35 (the same as the output terminal 22 in FIG. 2) is driven with a voltage between the high voltage VH to the low voltage VL by the first output buffer circuit 20. The supply voltages to the gate oxide films at the time of driving the output terminal 35 with the high voltage VH or the low voltage VL are described in FIGS. 7A and 7B in the order of from the PMOS source terminal to the NMOS source terminal. Even when the output terminal 35 is driven with any voltage between VH to VL without combining voltages greater than the withstanding voltages of the gate oxide films, that is, without supplying the voltage of VH−VL, it can be seen that all the voltages are in the range of the withstanding voltage $\Delta$Vlim.

As described above, in the driving circuit 10 according to this embodiment employing the first and second output buffer circuits 20 and 30A, it is possible to make a drive with the voltage amplitude VL−VH greater than the withstanding voltage $\Delta$Vlim by means of the first output buffer circuit 20 without supplying the gate oxide films of the transistors of the driving circuit 10 with a voltage greater than the withstanding voltage $\Delta$Vlim and in addition to make a drive with the middle voltage VM by means of the second output buffer circuit 30A.

Particularly, in the second output buffer circuit 30A, since the sum of the current Ip in the first buffer 31 and the current In flowing in the second buffer 32 serves as the supply current to the output terminal 35, it is possible to obtain great driving power in a wide range.

As a method of increasing the supply current to the output terminal 35, a method of changing a substrate bias voltage of the transistors Mp31, Mp32, Mn31, and Mn32 to change the threshold values Vthp and Vthn is known (for example, see JP-A-2006-323040). When the substrate bias voltage is changed to decrease the threshold values Vthp and Vthn by making a drive with the middle voltage VM using this method, it is possible to increase the supply current to the output terminal 35.

However, when it is intended to use the method of changing the substrate bias voltage to change the threshold values Vthp and Vthn and to apply different substrate bias voltages to the transistors Mp31, Mp32, Mn31, and Mn32, it is necessary to form a well by transistors and to electrically isolate the wells. Accordingly, the area for the circuit elements (transistors) increases, which is not suitable for the decrease in area.

On the contrary, by using the second output buffer circuit 30A, it is possible to increase the supply current to the output terminal 35 without changing the substrate bias voltages of the transistors Mp31, Mp32, Mn31, and Mn32. Accordingly, it is possible to mount the circuit elements (transistors Mp31, Mp32, Mn31, and Mn32) with a small area.

Example 2

Figure 8:
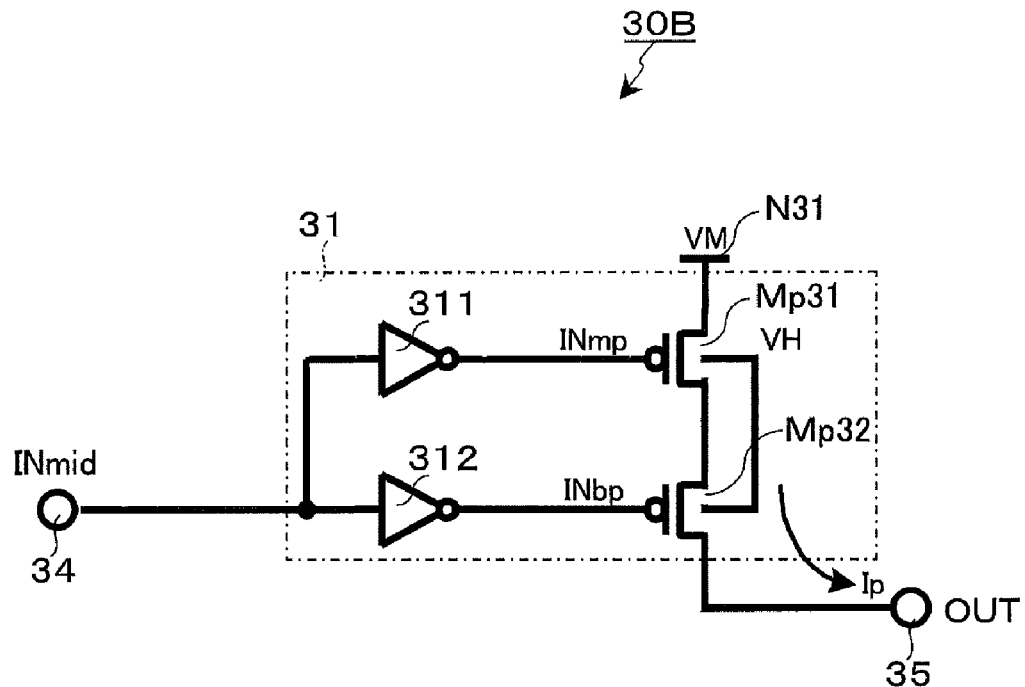
FIG. 8 is a circuit diagram illustrating a circuit configuration of a second putout buffer circuit according to Example 2.

FIG. 8 is a circuit diagram illustrating a circuit configuration of a second output buffer circuit 30B according to Example 2 of the invention, where elements equivalent to those of FIG. 4 are denoted by like reference numerals.

As shown in FIG. 8, the second output buffer circuit 30B according to Example 2 is formed of a buffer unit 31 including PMOS transistors. The buffer unit 31 is equivalent to the first buffer unit 31 of the second output buffer circuit 30A according to Example 1.

That is, the buffer unit 31 includes a PMOS transistor Mp31 whose source electrode is connected to a node N31 of the middle voltage VM, a PMOS transistor Mp32 whose source electrode is connected to the drain electrode of the PMOS transistor Mp31 and whose drain electrode is connected to an output terminal 35, and two level shifters 311 and 312.

The level shifter 311 shifts in level an input pulse INmid to a pulse signal of a VL−VH amplitude and applies the shifted pulse signal to the gate electrode the PMOS transistor Mp31. A circuit example of the level shifter 311 will be described later. The level shifter 312 shifts in level an input pulse INmid to a pulse signal of a VL−VD amplitude and applies the shifted pulse signal to the gate electrode of the PMOS transistor Mp32. The level shifter 312 can be embodied, for example, by the first output buffer circuit 20.

Figure 9:
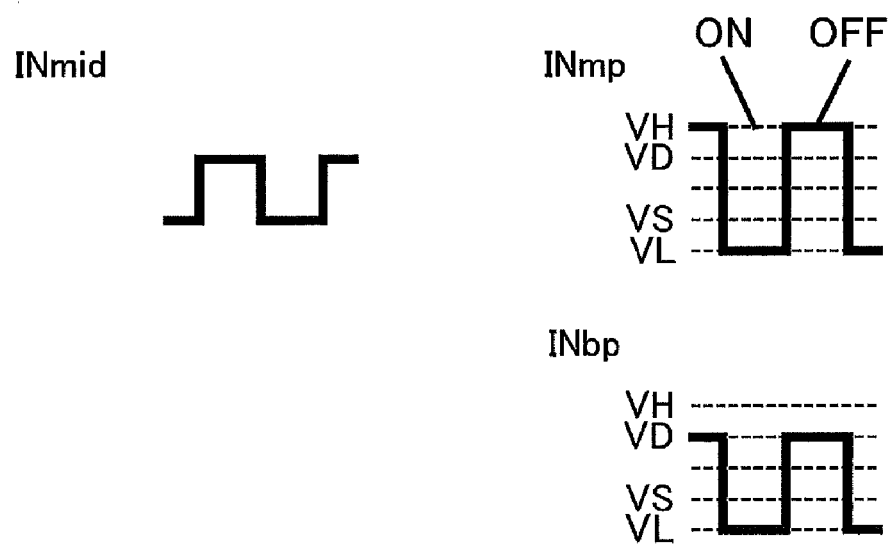
FIG. 9 is a diagram illustrating input and output waveforms of the second output buffer circuit according to Example 2.

FIG. 9 shows waveforms of the input pulse INmid and pulses INmp and INbp input to the gate electrodes of the PMOS transistors Mp31 and Mp32.

In the second output buffer circuit 30B according to Example 2, current Ip indicated by a solid line in FIG. 6 can be supplied to the output terminal 35, thereby making a drive with the middle voltage VM in the range of VL−Vthp$\leq$VM. However, compared with the second output buffer circuit 30A according to Example 1, the supply current Ip decreases as it gets close to VL−Vthp and thus the driving ability is deteriorated.

Example 3

Figure 10:
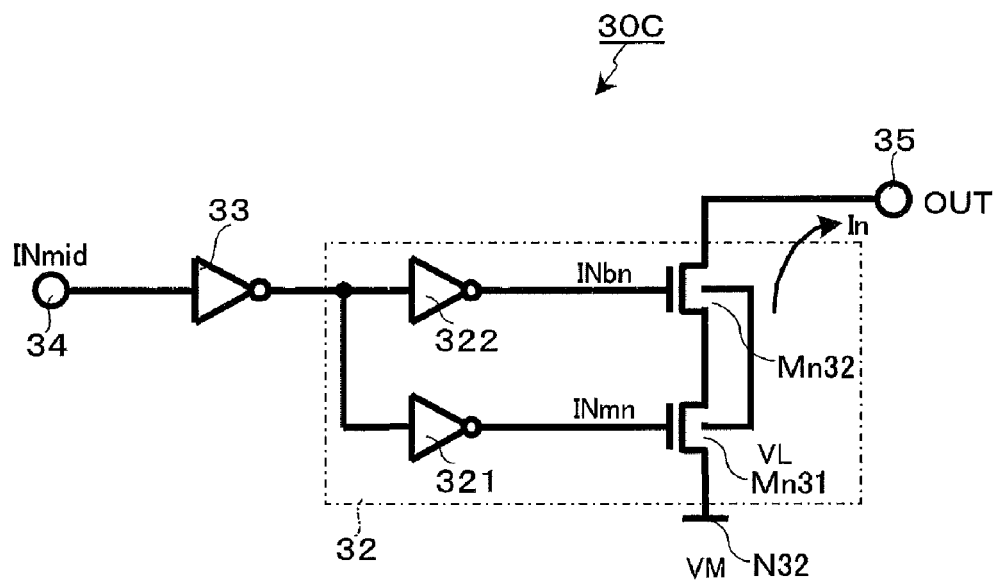
FIG. 10 is a circuit diagram illustrating a circuit configuration of a second putout buffer circuit according to Example 3.

FIG. 10 is a circuit diagram illustrating a circuit configuration of a second output buffer circuit 30C according to Example 3, where elements equivalent to those of FIG. 4 are denoted by like reference numerals.

As shown in FIG. 10, the second output buffer circuit 30C according to Example 3 is formed of a buffer unit 32 including NMOS transistors and an inverter unit 33. The buffer unit 32 is equivalent to the second buffer unit 32 of the second output buffer circuit 30A according to Example 1.

That is, the buffer unit 32 includes an NMOS transistor Mn31 whose source electrode is connected to a node N32 of the middle voltage VM, an NMOS transistor Mn32 whose source electrode is connected to the drain electrode of the NMOS transistor Mn31 and whose drain electrode is connected to an output terminal 35, and two level shifters 321 and 322.

The level shifter 321 shifts in level an input pulse INmid, the polarity of which is inverted by the inverter unit 33, to a pulse signal of a VL−VH amplitude and applies the shifted pulse signal to the gate electrode the NMOS transistor Mn31. A circuit example of the level shifter 321 will be described later. The level shifter 322 shifts in level an input pulse INmid, the polarity of which is inverted by the inverter unit 33, to a pulse signal of a VL−VD amplitude and applies the shifted pulse signal to the gate electrode of the NMOS transistor Mn32. The level shifter 322 can be embodied, for example, by the first output buffer circuit 20.

Figure 11:
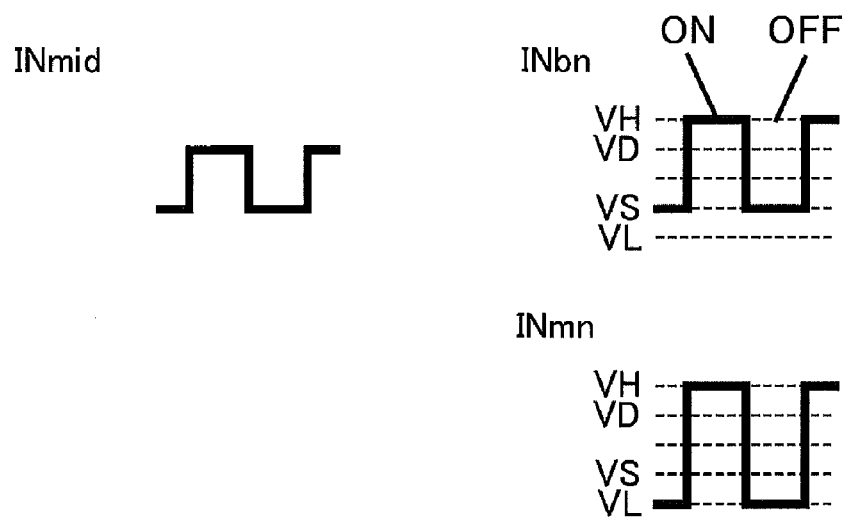
FIG. 11 is a diagram illustrating input and output waveforms of the second output buffer circuit according to Example 3.

FIG. 11 shows waveforms of the input pulse INmid and pulses INmn and INbn input to the gate electrodes of the NMOS transistors Mn31 and Mn32.

In the second output buffer circuit 30C according to Example 3, current In indicated by a solid line in FIG. 6 can be supplied to the output terminal 35, thereby making a drive with the middle voltage VM in the range of VM≦VH−Vthn. However, compared with the second output buffer circuit 30A according to Example 1, the supply current In decreases as it gets close to VH−Vthn and thus the driving ability is deteriorated.

Level Shifter

Figure 12A:
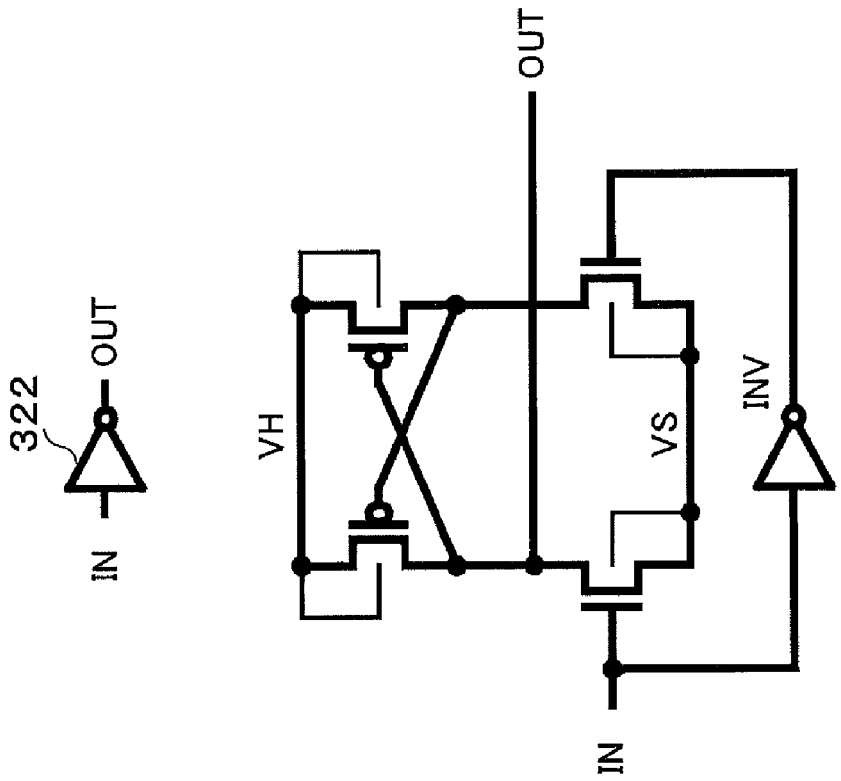
FIGS. 12A and 12B are circuit diagrams illustrating a circuit configuration of a level shifter.
Figure 12B:
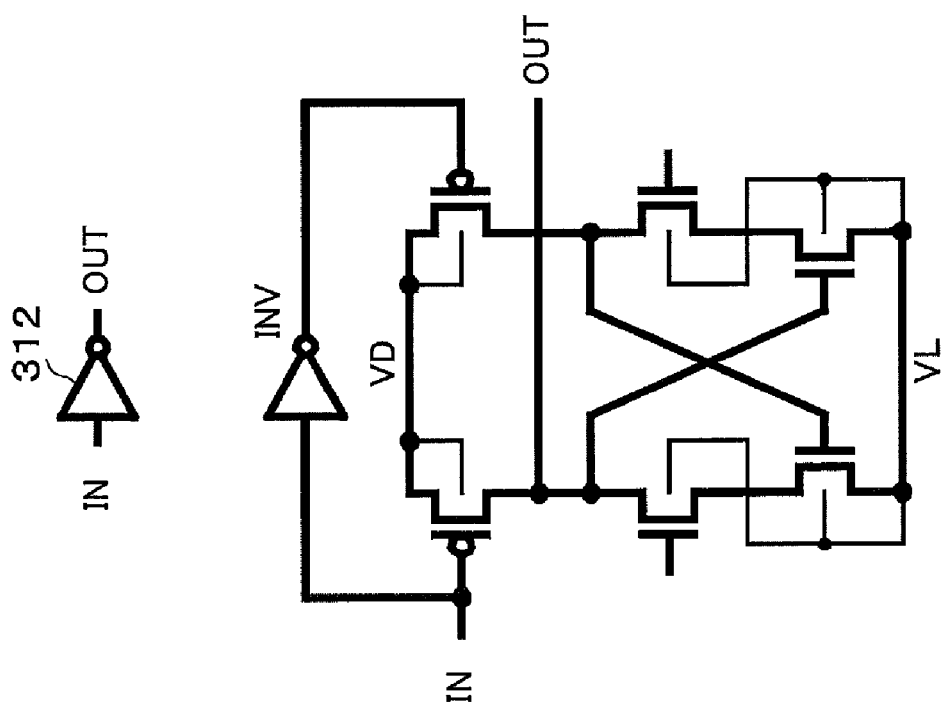

For example, a level shifter having a known circuit configuration shown in FIGS. 12A and 12B can be used as the level shifters 312 and 322 used in the second output buffer circuits 30A, 30B, and 30C according to Examples 1, 2, and 3 described above.

The level shifter shown in FIG. 12A is used as the level shifter 312 of the second output buffer circuits 30A and 30B according to Examples 1 and 2 to shift the input pulse IN to the pulse signal of the VD−VL amplitude in level. The level shifter shown in FIG. 12B is used as the level shifter 322 of the second output buffer circuits 30A and 30C according to Examples 1 and 3 to shift the input pulse IN to the pulse signal of the VH−VS amplitude in level.

Although it is assumed in the above-mentioned embodiment that the voltage amplitude VL−VH is greater than the withstanding voltage ΔVlim of the transistor, this is an example and the invention is not limited to the example. That is, whether VL−VH is greater than the withstanding voltage or nor, it is possible to make a drive with the middle voltage VM. However, when the voltage amplitude VL−VH is greater than the withstanding voltage ΔVlim, it is possible to make a drive with the low voltage VL to the high voltage VH and the middle voltage VM without using the high voltage process.

To secure the withstanding voltage ΔVlim of the gate oxide film, the middle voltage VM relative to the withstanding voltage ΔVlim need satisfy the condition of VH−ΔVlim≦VM≦VL+ΔVlim.

Although it has been described in the above-mentioned embodiment that the driving circuit 10 includes the first output buffer circuit 20 as well as the second output buffer circuit 30 (30A, 30B, and 30C), the first output buffer circuit 20 is not essential to the invention. Even when the driving circuit includes only the second output buffer circuit 30, it is possible to make a drive with the middle voltage VM without applying a voltage greater than the withstanding voltage ΔVlim to the gate oxide films of the transistors of the driving circuit.

Modified Example

Figure 13:
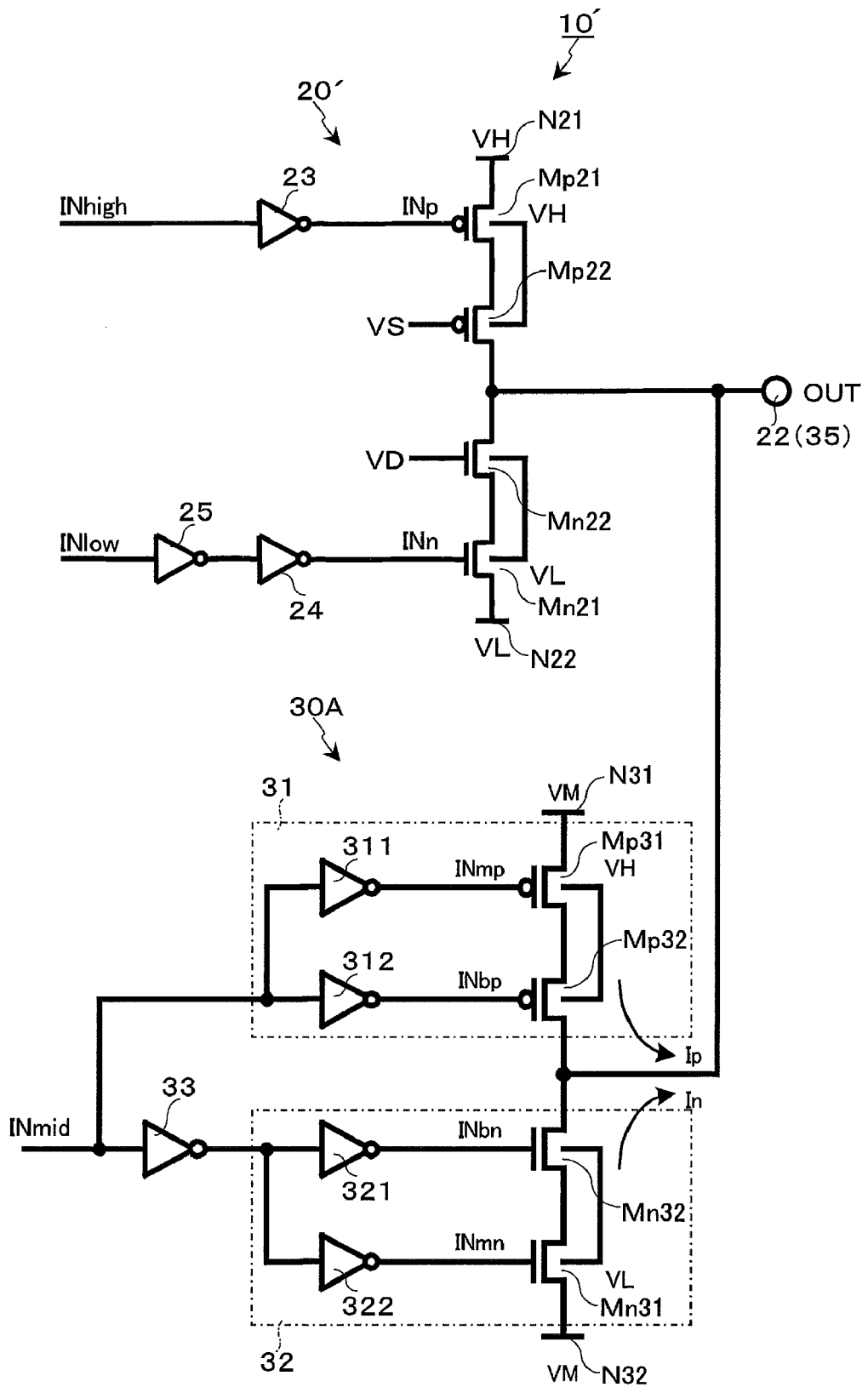
FIG. 13 is a circuit diagram illustrating a configuration of a driving circuit according to a modified example of the embodiment.

FIG. 13 is a circuit diagram illustrating a modified example of the driving circuit 10 according to the embodiment. Here, the second output buffer circuit 30A according to Example 1 is used as the second output buffer 30.

The first output buffer circuit 20' basically has the same circuit configuration as the first output buffer circuit 20. However, the input on the PMOS side and the input on the NMOS side are separated from each other. The VH-driving input pulse INhigh is directly applied to the gat electrode of the PMOS driving transistor Mp21 through the level shifter 23, but the VL-driving input pulse INlow is inverted by the inverter 25 and is then applied to the gate electrode of the NMOS driving transistor Mn21 through the level shifter 24.

Figure 14:
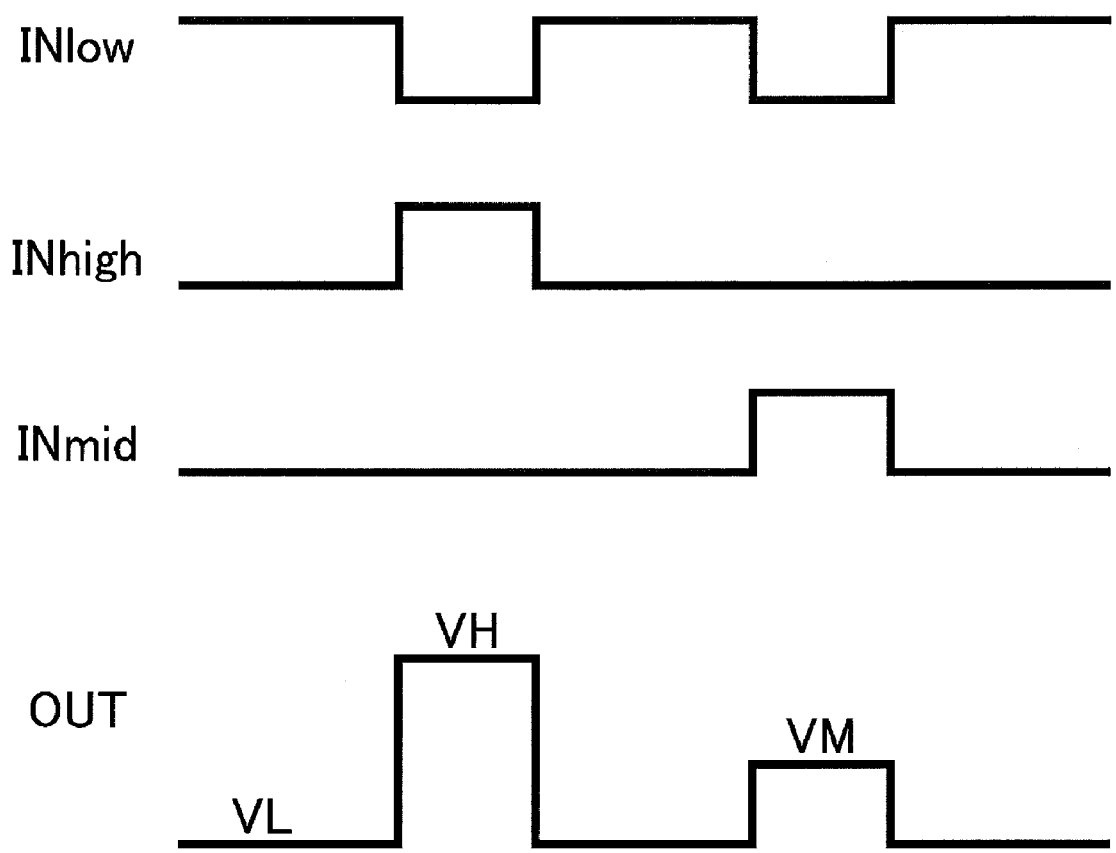
FIG. 14 is a diagram illustrating input and output waveforms of the driving circuit according to the modified example.

FIG. 14 shows a timing relation between the VH-driving input pulse INhigh, the VL-driving input pulse INlow, the VM-driving input pulse INmid, and the output voltage OUT.

As can be seen from FIG. 14, a drive is made with the low voltage VL in a period when the input pulse INlow is at the HIGH potential, a drive is made with the high voltage VH in a period when the input pulse INhigh is at the HIGH potential, and a drive is made with the middle voltage VM in a period when the input pulse INmid is at the HIGH potential. In the driving circuit 10' according to the modified example, the input pulses INlow, INhigh, and INmid are controlled to be exclusively at the HIGH potential.

Applications

The driving circuit 10 according to the embodiment of the invention or the driving circuit 10' according to the modified example can be applied to driving circuits for driving a load with the middle voltage VM in the range of VH−ΔVlim≦VM≦VL+ΔVlim without applying a voltage greater than the withstanding voltage ΔVlim to the gate oxide films of the transistors of the output buffer circuits or the level shifters.

For example, the above-mentioned driving circuits can be applied to intra-pixel transistor driving circuits for driving a transistor having a withstanding voltage of 3.0 V with a voltage of −1.0 V to 3.0 V greater than the withstanding voltage as a control signal of the transistor in a pixel in a solid-state imaging device and in addition driving the transistor with the middle voltage of about 1.0 V.

Solid-State Imaging Device

Figure 15:
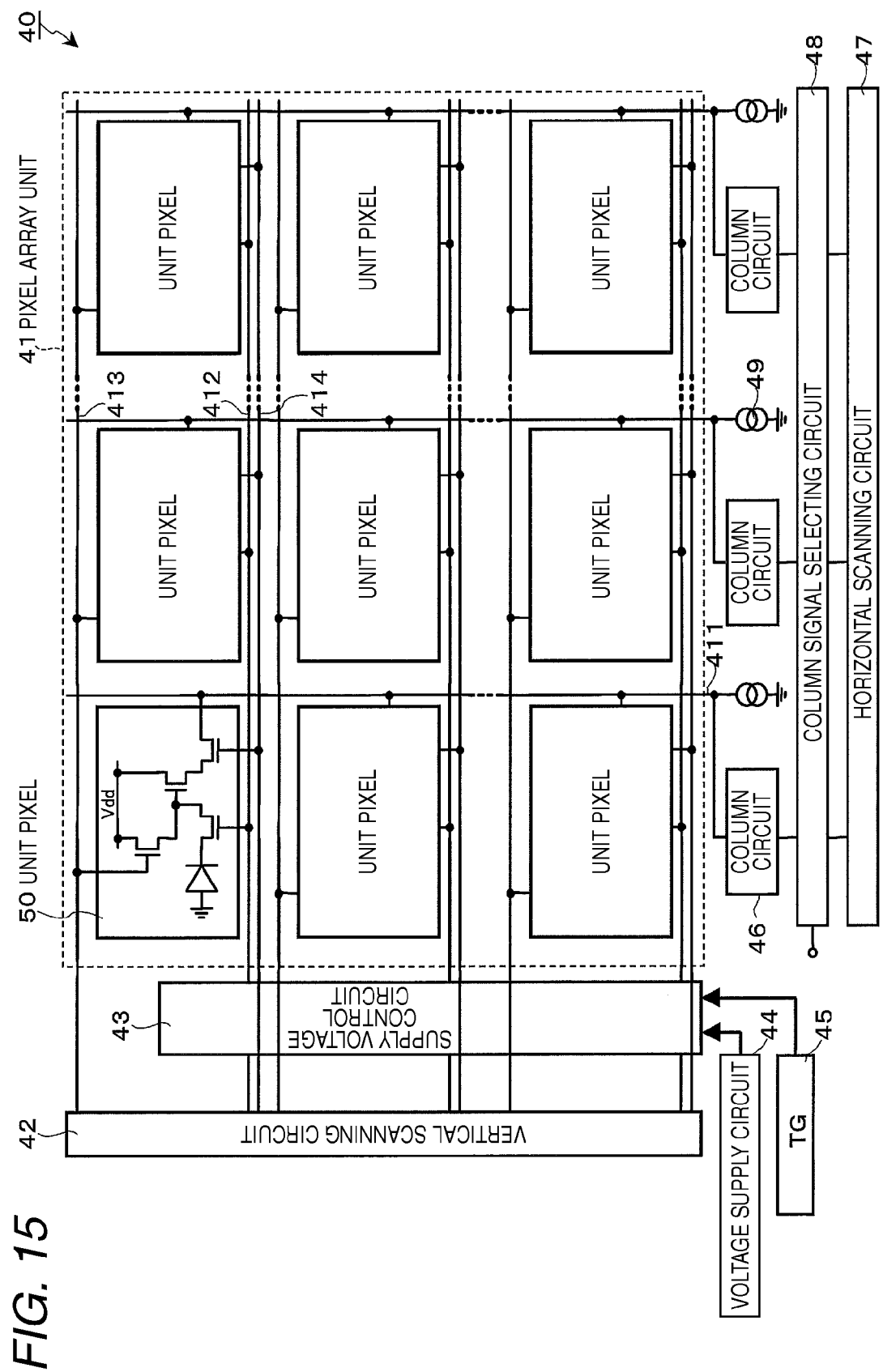
FIG. 15 is a system diagram illustrating a configuration of a CMOS image sensor employing the driving circuit according to the embodiment of the invention.

FIG. 15 is a system diagram illustrating a configuration of a solid-state imaging device such as a CMOS image sensor employing the driving circuit according to the embodiment of the invention.

As shown in FIG. 15, the CMOS image sensor 40 according to an application of the invention includes a pixel array unit 41 in which unit pixels (hereinafter, also simply referred to as "pixel") 50 including a photoelectric converter are two-dimensionally arranged in a matrix and peripheral circuits thereof.

The peripheral circuits of the pixel array unit 41 include, for example, a vertical scanning circuit 42, a supply voltage control circuit 43, a voltage supply circuit 44, a timing generating circuit (TG) 45, plural column circuits 46, a horizontal scanning circuit 47, and a column signal selecting circuit 48.

In the matrix arrangement of the pixels 50 in the pixel array unit 41, a vertical signal line 411 is disposed every pixel column and driving control lines such as a transfer control line 412, a reset control line 413, and a selection control line 414 are disposed every pixel row.

A static current source 49 is connected to an end of each vertical signal line 411. A current-bias transistor whose gate electrode is biased with a bias voltage Vbias and which constitutes a source follower circuit along with an amplification transistor 54 to be described later may be used instead of the static current source 49 (see FIG. 16).

The vertical scanning circuit 42 includes a shift register or an address decoder and serves to perform an electronic shutter operation of sweeping out signals of the pixels 50 in an electronic shutter row and to perform a reading operation of reading signals of the pixels 50 in a reading row while scanning the pixels 50 in the pixel array unit 41 in the vertical direction (upward and downward directions) in the unit of rows of electronic shutter rows and reading rows.

Although not shown, the vertical scanning circuit 42 includes a reading scanning system for performing the reading operation of reading signals of the pixels 50 in the reading row while sequentially selecting the rows of the pixels 50 and an electronic shutter scanning system for performing the electronic shutter operation on the row (electronic shutter row) previous by the time corresponding to a shutter speed from the reading scanning operation of the reading scanning system.

A period of time from a time point when unnecessary charges of the photoelectric converters are reset by the electronic shutter scanning of the electronic shutter scanning system to a time point when the signals of the pixels 50 are read by the reading scanning of the reading scanning system is a unit storage period (exposure period) of signal charges in the pixels 50. That is, the electronic shutter operation is an operation of resetting (sweeping out) the signal charges stored in the photoelectric converters and newly starting storing the signal charges after the reset.

The supply voltage control circuit 43 controls a voltage value (wave height) of a transfer pulse TRG supplied (applied) to the gate electrode (control electrode) of a transfer transistor (transfer element) 52 of each unit pixel 50.

The voltage supply circuit 44 supplies plural control voltages having different values to the supply voltage control circuit 43. The plural control voltages are transfer pulses TRG having different voltage values and are supplied to the gate electrodes of the transfer transistors 52. The details of the transfer pulses TRG having different voltage values will be described later.

The timing generating circuit (TG) 45 generates a timing signal PTRG determining the timing for allowing the supply voltage control circuit 43 to supply the transfer pulses TRG having different voltage values to the gate electrodes of the transfer transistors 52.

The column circuit 46 is disposed in each pixel column in the pixel array unit 41, that is, to correspond to each pixel column in an one-to-one manner and serves to perform predetermined signal processing on the signals output from the pixels 50 in the reading row selected by the vertical scanning of the vertical scanning circuit 42 through the vertical signal line 411 and to temporarily hold the processed pixel signals.

The column circuit 46 has a circuit configuration including a sampling and holding circuit sampling and holding the signals output through the vertical signal line 411 or a circuit configuration including a sampling and holding circuit and a noise removing circuit removing reset noises or fixed-pattern noises specific to the pixels such as threshold differences of the amplification transistors 54 by a CDS (Correlated Double Sampling) process.

However, the circuit configurations are only examples and the column circuit is not limited to the circuit configurations. For example, the column circuit 46 may have an AD (analog-digital) conversion function to output a signal level as a digital signal.

The horizontal scanning circuit 47 includes a shift register or an address decoder and serves to sequentially horizontally scan the column circuits 46 disposed every pixel column in the pixel array unit 41. The column signal selecting circuit 48 includes a horizontal selection switch and horizontal signal lines and serves to sequentially output the pixel signals temporarily stored in the column circuits 46 in synchronization with the horizontal scanning of the horizontal scanning circuit 47.

The timing signals and the control signals used as operation reference of the vertical scanning circuit 42, the column circuits 46, and the horizontal scanning circuit 47 are generated by a timing control circuit not shown.

Pixel Circuit

Figure 16:
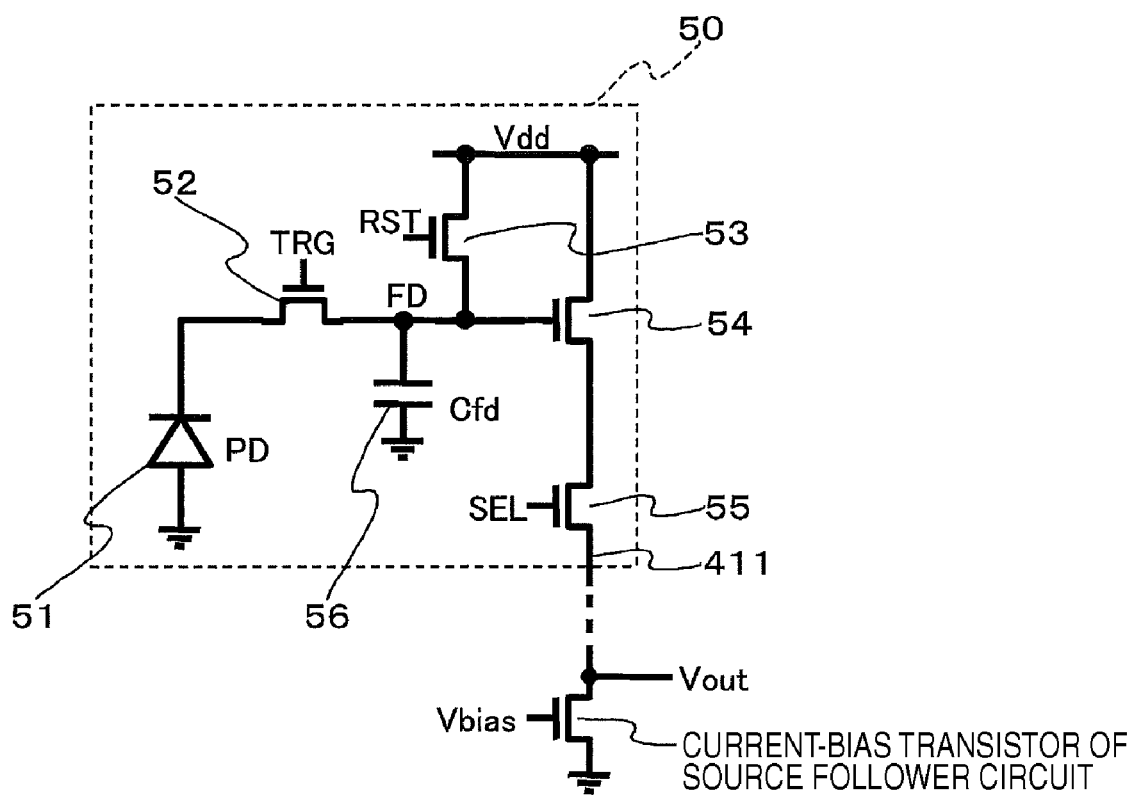
FIG. 16 is a circuit diagram illustrating a configuration of a unit pixel.

FIG. 16 is a circuit diagram illustrating an example of a circuit configuration of a unit pixel 50. The unit pixel 50 in this circuit example includes a photoelectric conversion element (photoelectric converter) 51 such as an embedded photo diode and four transistors of a transfer transistor (transfer element) 52, a reset transistor 53, an amplification transistor 54, and a selection transistor 55. Here, N-channel MOS transistors are used as the transistors 52 to 55, but the transistors are not limited to the N-channel MOS transistors.

The transfer transistor 52 is connected between the cathode of the photoelectric conversion element 51 and a floating-diffusing capacitor (FD) 56 and serves to transfer signal charges (electrons) photoelectrically converted and stored by the photoelectric conversion element 51 to the floating-diffusing capacitor 56 by applying a transfer pulse TRG to the gate electrode (control electrode) through the transfer control line 412. The floating-diffusing capacitor 56 serves as a charge-voltage converter converting the signal charges into a voltage signal.

The drain electrode of the reset transistor 53 is connected to the reset line 415 and the source electrode thereof is connected to the floating-diffusing capacitor 56. The reset transistor resets the potential of the floating-diffusing capacitor 56 with a reset voltage Vrst by applying a reset pulse RST to the gate electrode through the reset control line 413 before transferring the signal charges from the photoelectric conversion element 51 to the floating-diffusing capacitor 56.

The gate electrode of the amplification transistor 54 is connected to the floating-diffusing capacitor 56 and the drain electrode thereof is connected to a pixel power source of a source voltage Vdd. The amplification transistor outputs the potential of the floating-diffusing capacitor 56 after the resetting of the reset transistor 53 as a reset level and outputs the potential of the floating-diffusing capacitor 26 after the transferring of signal charges by the transfer transistor 52 as a signal level.

The drain electrode of the selection transistor 55 is connected to the source electrode of the amplification transistor 54 and the source electrode thereof is connected to the vertical signal line 411. The selection transistor is turned on by applying a selection pulse SEL to the gate electrode through the selection control line 414 to select the corresponding pixel 50 and outputs the signal output from the amplification transistor 54 to the vertical signal line 411. The selection transistor 55 may be connected between the pixel power source (Vdd) and the drain electrode of the amplification transistor 54.

Here, the CMOS image sensor including the unit pixels 50 each having four transistors of the transfer transistor 52, the reset transistor 53, the amplification transistor 54, and the selection transistor 55 is exemplified, but the invention is not limited to this application.

Supply Voltage Control Circuit

The supply voltage control circuit 43 receives an address signal ADR for driving a row selected by the vertical scanning circuit 42 as an input and serves to select one of plural voltages supplied from the voltage supply circuit 44 and to supply the selected voltage to the gate electrode of the transfer transistor 52 in the unit pixel 50 as the transfer pulse TRG.

As the plural voltages, an ON voltage Von for changing the transfer transistor 52 to an ON (electrically-connected) state, an OFF voltage Voff for changing the transfer transistor 52 to an OFF (electrically-disconnected) state, and a middle voltage Vmid between the ON voltage Von and the OFF voltage Voff are supplied from the voltage supply circuit 44. Here, the middle voltage Vmid is a voltage for holding a part of stored charges in the photoelectric conversion element 51 and partially transferring the other stored charges to the floating-diffusing capacitor 56.

In the above-mentioned pixel circuit, based on the fact that the transfer transistor 52 is of an N-channel type, the source voltage Vdd (corresponding to the high voltage VH in the above-mentioned embodiment) is used as the ON voltage Von and the ground voltage, preferably a voltage (corresponding to the low voltage VL in the above-mentioned embodiment) lower than the ground voltage, is used as the OFF voltage Voff.

In this example, two middle voltages having different voltage values, specifically, two middle voltages Vmid0 and Vmid1 greater than the OFF voltage Voff and smaller than the ON voltage Von, are used as the middle voltage Vmid (corresponding to the middle voltage VM in the above-mentioned embodiment).

When the transfer transistor 52 is of a P-channel type, the ground voltage is used as the ON voltage Von, the source voltage Vdd is used as the OFF voltage Voff, and two middle voltages Vmid0 and Vmid1 greater than the ON voltage Von and smaller than the OFF voltage Voff are used as the middle voltage Vmid.

Accordingly, four voltages of the ON voltage Von, the middle voltages Vmid0 and Vmid1, and the OFF voltage Voff are supplied to the supply voltage control circuit 43 from the voltage supply circuit 44. The values of the four voltages satisfy a relation of Voff<Vmid0<Vmid1<Von. Among the four voltages, the middle voltages Vmid0 and Vmid1 and the ON voltage Von are used as the transfer pulses TRG.

In this way, by sequentially supplying the middle voltages Vmid0 and Vmid1 and the ON voltage Von to the transfer transistor 52 of each pixel in synchronization with the vertical scanning operation of the vertical scanning circuit 42 under the control of the supply voltage control circuit 43, it is possible to embody a 3-time transferring operation of transferring to the floating-diffusing capacitor 56 the signal charges stored in the photoelectric conversion element 51 by three times.

In this example, two middle voltages Vmid0 and Vmid1 as the middle voltage corresponding to the middle voltage VM in the above-mentioned embodiment are output from the supply voltage control circuit 43. However, this is an example, but the number of middle voltages Vmid may be one or three or more.

In the solid-state imaging device such as the CMOS image sensor 40 having the above-mentioned configuration, the above-mentioned driving circuit, specifically, the driving circuit 10 according to the above-mentioned embodiment or the driving circuit 10' according to the modified example thereof, can be used as an output stage of the supply voltage control circuit 43 driving the transfer control lines 412 disposed in the pixel rows and connected to the gate electrodes of the transfer transistors 52, that is, an output stage properly driving the transfer control lines 412 with the middle voltages Vmid0 and Vmid1 in addition to the ON voltage Von and the OFF voltage Voff.

Although the CMOS image sensor in which the unit pixels detecting signal charges corresponding to the intensity of visible light as a physical quantity are arranged in a matrix has been exemplified, the invention is not limited to the CMOS image sensor, but may be applied to various solid-state imaging devices having the driving with the middle voltage VM.

The solid-state imaging device may be embodied as a one chip or may be embodied as a module type having an imaging function in which an imaging unit, a signal processing unit, and an optical system are together packaged.

The invention is not limited to the solid-state imaging device, but can be applied to various electronic apparatuses employing the solid-state imaging device as an image input unit (photoelectric conversion unit), such as an imaging devices such as a digital camera and a video camera, portable terminals such as a mobile phone having an imaging function, and copiers employing the solid-state imaging device as an image reading unit. The module type device mounted on the electronic apparatuses, that is, a camera module, may be embodied by the imaging device.

Imaging Apparatus

Figure 17:
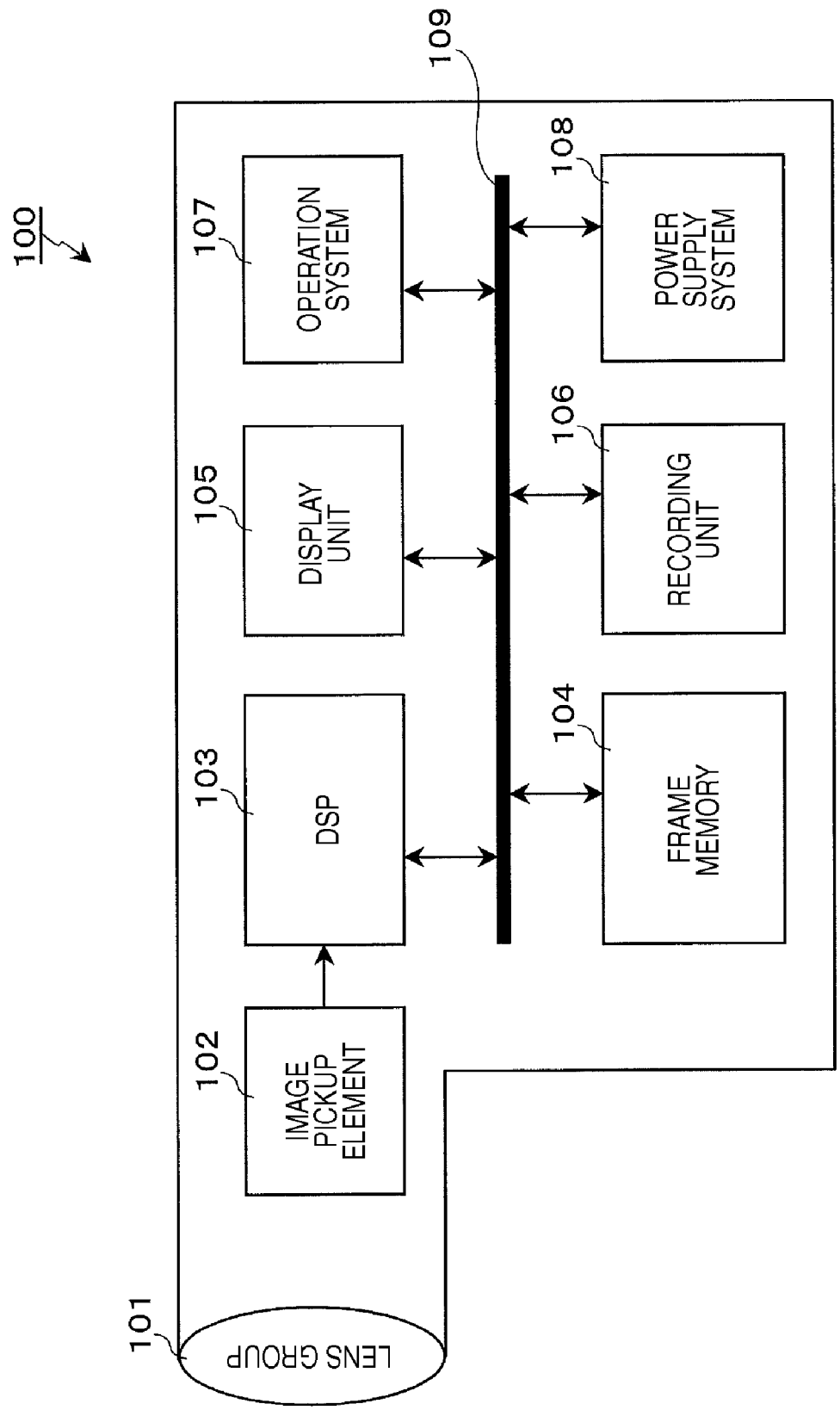
FIG. 17 is a block diagram illustrating a configuration of an imaging device according to an embodiment of the invention.
Figure 18:
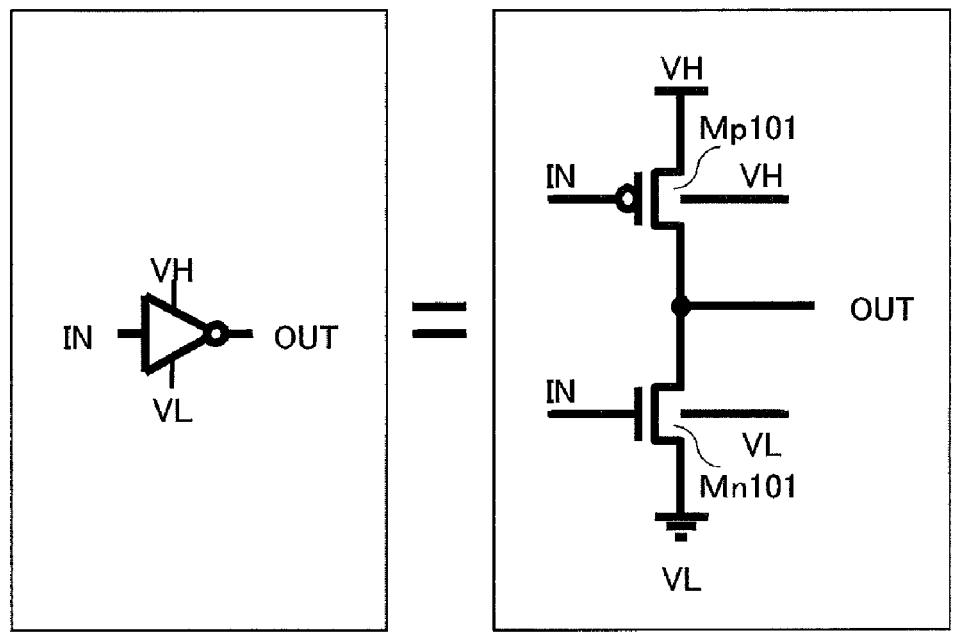
FIG. 18 is a block diagram illustrating a circuit configuration of an output buffer circuit according to Related Example 1.
Figure 19:
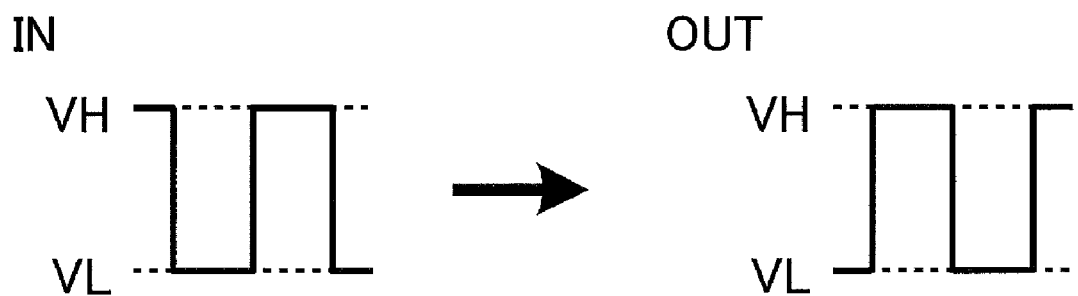
FIG. 19 is a diagram illustrating input and output waveforms of the output buffer circuit according to Related Example 1.
Figure 20A:
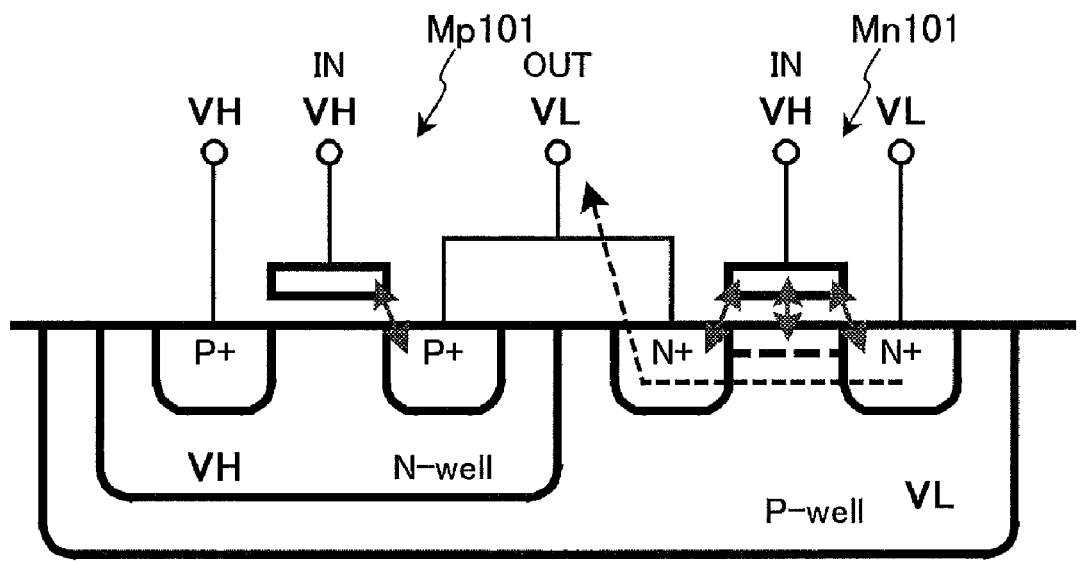
FIGS. 20A and 20B are sectional views illustrating a device section at the time of IN=VH and IN=VL, respectively, in the output buffer circuit according to Related Example 1.
Figure 20B:
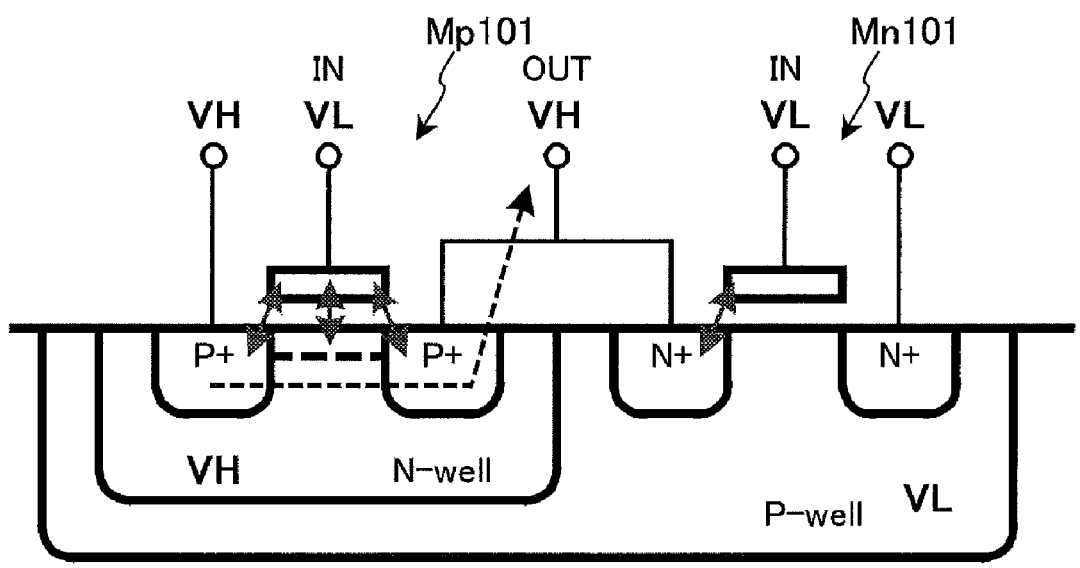

FIG. 17 is a block diagram illustrating an example of a configuration of an electronic apparatus such as an imaging apparatus according to an embodiment of the invention. As shown in FIG. 17, the imaging apparatus 100 according to an embodiment of the invention includes an optical system having a lens group 101, an imaging unit (imaging device) 102, a DSP circuit 103 as a camera signal processing circuit, a frame memory 104, a display unit 105, a recording unit 106, an operation system 107, and a power supply system 108. The DSP circuit 103, the frame memory 104, the display unit 105, the recording unit 106, the operation system 107, and the power supply system 108 are connected to each other through a bus line 109.

The lens group 101 receives incident light (image light) from a subject as an input and focuses the incident light on an imaging plane of the imaging device 102. The imaging device 102 converts the intensity of the incident light focused on the imaging plane by the lens group 101 into electrical signals in the unit of pixels and outputs the electrical signals as pixel signals. The solid-state imaging device such as the CMOS image sensor 40 according to the above-mentioned application, that is, the solid-state imaging device employing the driving circuit 10 according to the above-mentioned embodiment or the driving circuit 10' according to the modified example thereof as an output stage of the supply voltage control circuit 43 properly driving the transfer control lines 412 with the middle voltages Vmid0 and Vmid1 in addition to the ON voltage Von and the OFF voltage Voff, can be used as the imaging device 102.

The display unit 105 includes a panel type display device such as a liquid crystal display device or an organic EL (Electroluminescence) display device and displays a moving image or a still image taken by the imaging device 102. The recording unit 106 records the moving image or the still image taken with the imaging device 102 on a recording medium such as a video tape or a DVD (Digital Versatile Disk).

The operation system 107 generates an operating command for various functions of the imaging device in response to a user's operation. The power supply system 108 properly supplies a variety of power as operating power sources of the DSP circuit 103, the frame memory 104, the display unit 105, the recording unit 106, and the operation system 107.

It should be understood by those skilled in the art that various modifications, combinations, sub-combinations, and alternations may occur depending on design requirements and other factors insofar as they are within the scope of the appended claims or the equivalents thereof.

What is claimed is:

1. A driving circuit comprising, when a middle voltage within a withstanding voltage of a transistor from a first voltage VL as a low voltage of a source voltage and a second voltage VH as a high voltage of the source voltage is represented by VM and a third voltage within the withstanding voltage of a transistor from the second voltage VH or the first voltage VL is represented by VS or VD:

a first transistor whose source electrode is connected to a node of a middle voltage VM;

a second transistor whose source electrode is connected to the drain electrode of the first transistor and whose drain electrode is connected to an output terminal; and a controller applying a signal having an amplitude of a difference between the voltages VL and VH to the gate electrode of the first transistor and applying a signal having an amplitude of a difference between the voltages VS and VH or between the voltages VL and VD to the gate electrode of the second transistor.

2. The driving circuit according to claim 1, wherein the controller includes:
   a first level shifter shifting in level a signal of a predetermined amplitude to the signal of the amplitude of a difference between the voltages VL and VH and applying the shifted signal to the gate electrode of the first transistor; and
   a second level shifter shifting in level the signal of the predetermined amplitude to the signal having an amplitude of the difference between the voltages VS and VH or between the voltages VL and VD and applying the shifted signal to the gate electrode of the second transistor.

3. The driving circuit according to claim 1, further comprising:
   a first circuit employing P-type transistors as the first and second transistors;
   a second circuit employing N-type transistors as the first and second transistors; and
   an inverter inverting a signal of a predetermined amplitude input to the first circuit and inputting the inverted signal to the second circuit.

4. The driving circuit according to claim 1, wherein the first voltage VL and the second voltage VH are set so that the voltage amplitude of the difference between the voltages VL and VH is greater than the withstanding voltages of the first and second transistors.

5. A driving circuit comprising, when a middle voltage within a withstanding voltage of a transistor from a first voltage VL as a low voltage of a source voltage and a second voltage VH as a high voltage of the source voltage is represented by VM and a third voltage within the withstanding voltage of a transistor from the second voltage VH or the first voltage VL is represented by VS or VD:
   a first driving unit including a first transistor whose source electrode is connected to a node of the second voltage or the first voltage and whose gate electrodes is supplied with a signal having the amplitude of the difference between the voltages VS and VH or between the voltages VL and VD, and a second transistor whose source electrode is connected to the drain electrode of the first transistor, whose drain electrode is connected to an output terminal, and whose gate electrode is supplied with the third voltage VS or VD as a bias voltage and driving a load with the voltage amplitude of the difference between the voltages VL and VH; and
   a second driving unit including a third transistor whose source electrode is connected to a node of the middle voltage VM and whose gate electrode is supplied with a signal of a VL–VH, and a fourth transistor whose source electrode is connected to the drain electrode of the third transistor, whose drain electrodes is connected to the output terminal, and whose gate electrode is supplied with the signal having the amplitude of the difference between the voltages VS and VH or between the voltages VL and VD and driving the load with the middle voltage VM.

6. A driving method comprising the steps of, when a middle voltage within a withstanding voltage of a transistor from a first voltage VL as a low voltage of a source voltage and a second voltage VH as a high voltage of the source voltage is represented by VM and a third voltage within the withstanding voltage of a transistor from the second voltage VH or the first voltage VL is represented by VS or VD:

driving a first transistor whose source electrode is connected to a node of the middle voltage VM, with a voltage in the range of the first voltage VL to the second voltage VH; and
driving a second transistor whose source electrode is connected to the drain electrode of the first transistor and whose drain electrode is connected to an output terminal, with a voltage in the range of the first voltage VL to the third voltage VD or in the range of the third voltage VD or the second voltage VH.

7. A solid-state imaging device comprising:
   a pixel array unit in which unit pixels each having a photoelectric conversion unit converting an incident light into a signal charge and a transfer element transferring the signal charge converted by the photoelectric conversion unit are arranged; and
   a driving unit driving the transfer element with a control voltage, the driving unit holding a part of the signal charge stored in the photoelectric conversion unit in a unit storage period in the photoelectric conversion unit and transferring the stored charges greater than the amount of held charges by the use of the transfer element,
   wherein a driving circuit is used as an output unit outputting the control voltage to the driving unit, and
   wherein the driving circuit includes: when a middle voltage within a withstanding voltage of a transistor from a first voltage VL as a low voltage of a source voltage and a second voltage VH as a high voltage of the source voltage is represented by VM and a third voltage within the withstanding voltage of a transistor from the second voltage VH or the first voltage VL is represented by VS or VD,
   a first transistor whose source electrode is connected to a node of the middle voltage VM and whose electrode is supplied with a signal having an amplitude of a difference between the voltages VL and VH, and a second transistor whose source electrode is connected to the drain electrode of the first transistor, whose drain electrode is connected to an output terminal, and whose gate electrode is supplied with a signal having an amplitude of a difference between the voltages VS and VH or between the voltages VL and VD, and
   outputs the middle voltage VM as the control voltage.

8. An electronic apparatus mounted with a solid-state imaging device, the solid-state imaging device comprising:
   a pixel array unit in which unit pixels each having a photoelectric conversion unit converting an incident light into a signal charge and a transfer element transferring the signal charge converted by the photoelectric conversion unit are arranged; and
   a driving unit driving the transfer element with a control voltage, the driving unit holding a part of the signal charge stored in the photoelectric conversion unit in a unit storage period in the photoelectric conversion unit and transferring the stored charges greater than the amount of held charges by the use of the transfer element,
   wherein an output unit outputting the control voltage to the driving unit includes: when a middle voltage within a withstanding voltage of a transistor from a first voltage VL as a low voltage of a source voltage and a second voltage VH as a high voltage of the source voltage is represented by VM and a third voltage within the withstanding voltage of a transistor from the second voltage VH or the first voltage VL is represented by VS or VD, a first transistor whose source electrode is connected to a node of the middle voltage VM and whose gate electrode is supplied with a signal having an amplitude of a difference between the voltages VL and VH, and a second transistor whose source electrode is connected to the drain electrode of the first transistor, whose drain electrode is connected to an output terminal, and whose gate electrode is supplied with a signal having an amplitude of a difference between the voltages VS and VH or between the voltages VL and VD, and outputs the middle voltage VM as the control voltage.

* * * * *